United States Patent [19]
DeSimone

[11] Patent Number: 5,933,274
[45] Date of Patent: Aug. 3, 1999

[54] DYE LASER SYSTEM

[75] Inventor: Andrew F. DeSimone, 12 Mt Vernon St., Gloucester, Mass. 01930

[73] Assignee: Andrew F. DeSimone, Gloucester, Mass.

[21] Appl. No.: 08/857,027

[22] Filed: May 15, 1997

[51] Int. Cl.[6] .................................................. G02B 21/06
[52] U.S. Cl. ............................................ 359/390; 372/54
[58] Field of Search .................................... 359/385, 390; 372/53, 54

[56] References Cited

U.S. PATENT DOCUMENTS

| | | | |
|---|---|---|---|
| 4,404,679 | 9/1983 | Chiu et al. | 372/54 |
| 5,572,360 | 11/1996 | Gaul | 359/390 |

*Primary Examiner*—James W. Davie

[57] ABSTRACT

A dye laser assembly for attaching to an optical microscope.

8 Claims, 19 Drawing Sheets

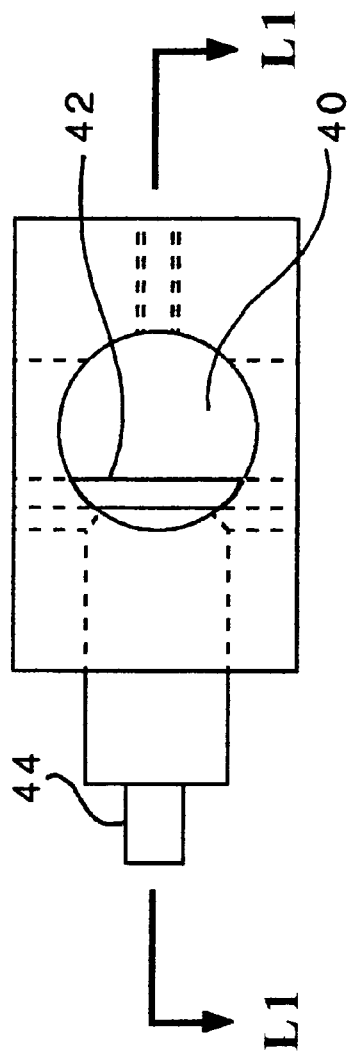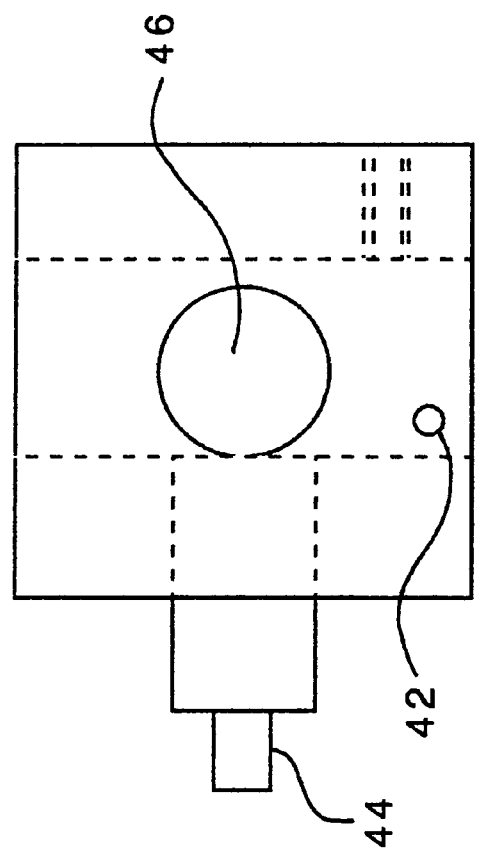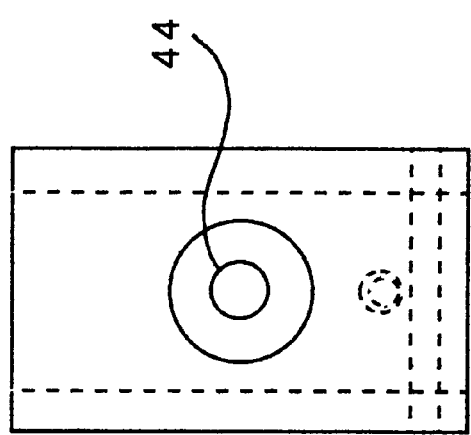

DYE LASER SYSTEM

BACKGROUND OF THE INVENTION

1. Field of the Invention

This invention relates generally to optically-pumped dye laser systems, and, more particularly, to optically-pumped dye laser systems for use with microscopes to produce localized areas of high laser energy density at the specimen plane.

2. Description of Related Art

Dye lasers are tunable to a range of different wavelengths, from approximately 340 nm to 1200 nm. Tunable dye lasers are well-suited for the study of biological materials, because thermochemical, photochemical, and photoablative reactions depend critically upon the wavelength of light and absorption maxima of tissue.

The output wavelength of a dye laser depends upon the pump source wavelength and lasing characteristics of the fluorescent dye being optically pumped. Dye laser tuning may be accomplished by tuning elements in the laser resonator cavity, by changing the type or concentration of fluorescent dye, by changing the type of dye solvent in the dye cell, or any combination of the above.

A dye laser in combination with an optical microscope can deliver finely focussed, high intensity beams to many types of specimens. It has been difficult and tedious, however, to align the optical axis of a complex optical microscope to be coincident to the axis of a dye laser system. Besides the considerable time and skill required for laser alignment, a substantial amount of hardware is necessary, such as an optical table, lenses, mirrors, positioners, and mounting plates and posts.

A drawback to conventional, high precision dye lasers with removable dye cells is the need to realign the dye laser after changing dye cells. To use such dye lasers with a microscope as discussed above, the entire system must be realigned.

SUMMARY OF THE INVENTION

It is an object of the present invention to provide a high precision dye laser system that avoids the complex realignment discussed above, and that is simple to operate and easy to maintain.

To achieve this and other objects of the present invention, a system for observing a magnified image of an object and for projecting laser radiation onto the object at a location corresponding to the image, comprises a microscope including a first optical path for projecting light onto the object, a second optical path for receiving light reflected from the object; and a laser assembly, removably attached to the first optical path, the laser assembly including a dye cell defining a cavity for containing a liquid, the dye cell including a first window for receiving radiation and a second window for emitting radiation, a wall defining a cavity for receiving the dye cell, a connector, attached to the wall, for removably attaching to an optical cable, and a screw mechanism for biasing the dye cell against the wall, to align the first window with the optical cable and to align the second window with the first optical path of the microscope.

According to another aspect of the present invention, a dye cell for a laser assembly comprises a first mirror; a second mirror opposed to the first mirror, the second mirror being partially reflective emitting radiation to the outside of the dye cell; and a window for receiving radiation from outside the dye cell, the window having a major surface transverse to the first and second mirrors, wherein the first and second mirrors and the window define a cavity for containing a liquid, and the window defines an interior surface extending into the liquid cavity.

According to yet another aspect of the present invention, a laser assembly for an optical microscope comprises a dye cell for generating a laser beam, the dye cell including a first mirror, a second mirror opposed to the first mirror, the second mirror being partially reflective emitting radiation to the outside of the dye cell, and a window for receiving radiation from outside the dye cell, the window having a major surface transverse to the first and second mirrors, wherein the first and second mirrors and the window define a cavity for containing a liquid; a dye cell holder including means for positioning and securing the dye cell in six-axis spatial alignment relative to the dye cell holder; a first beam displacer, in an optical path between the dye cell and the microscope, including an optical element with two parallel surfaces nominally perpendicular to the axis of the optical path, and having a means to rotate the optical element about the axis of the dye laser beam; a second beam displacer, in the optical path, including an optical element with two parallel surfaces nominally perpendicular to the axis of the optical path, and having a means to rotate the optical element about the axis of the dye laser beam; a telescope, between the first and second beam displacers, including means for bringing the laser beam to focus at a location outside of the laser assembly.

BRIEF DESCRIPTION OF THE DRAWINGS

FIGS. 7A, 7B, 7C and 7D show front, top, side and views of the dye cell holder, and a sectional view of a dye cell secured within a dye cell holder, respectively.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENT

Figure 1:
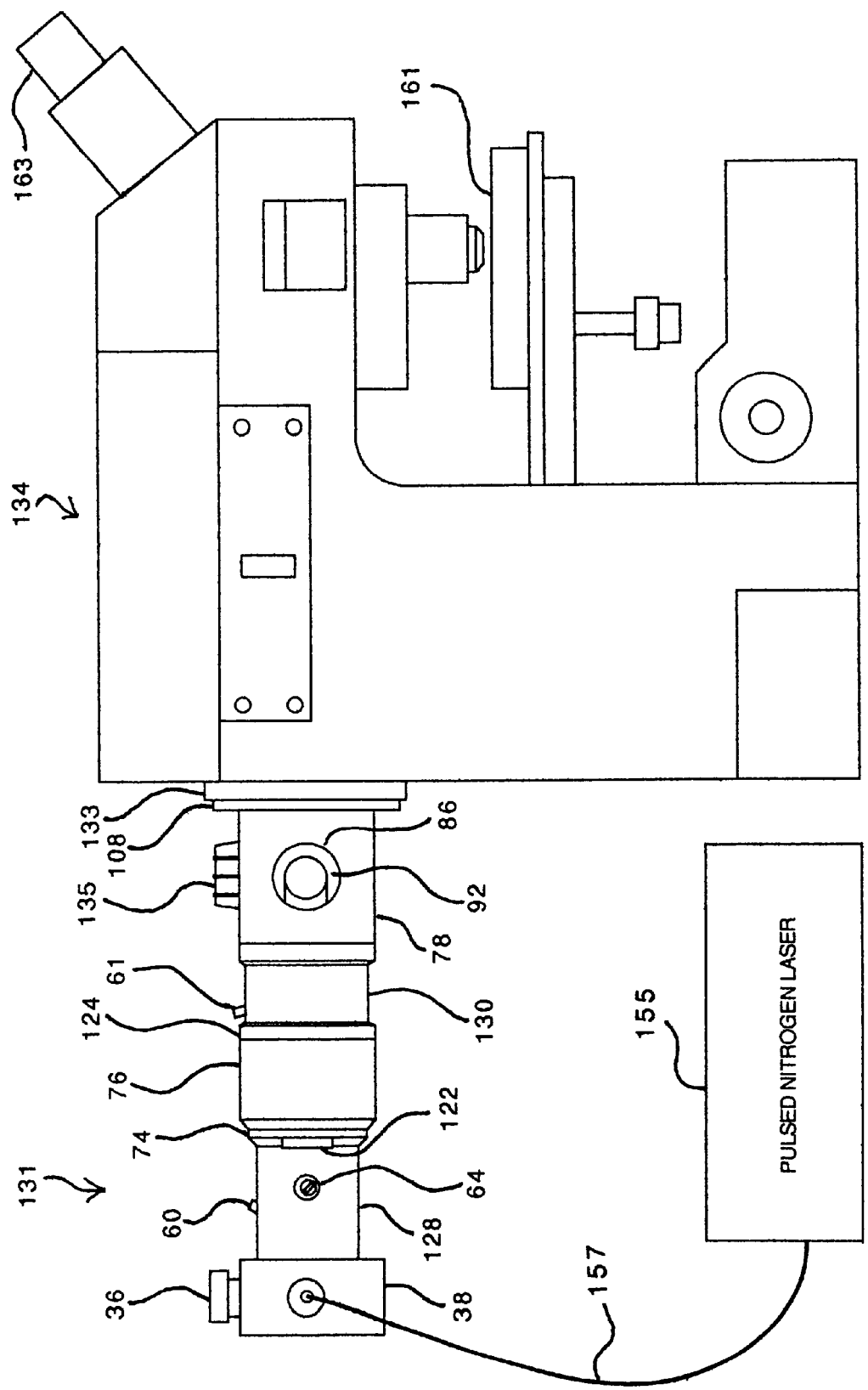
FIG. 1 is a diagram of a laser assembly mounted on an optical microscope, according to the preferred embodiment of the invention.

FIG. 1 is an external view of a dye laser system according to a preferred embodiment of the present invention. The preferred system includes laser assembly 131 and microscope 134. Laser assembly 131 includes microscope flange 108 removably connected to epi-illumination flange 133 of microscope 134.

The preferred system can perform molecularly selective illumination and ablation of a specimen on specimen plane 161, with up to 50 micro Joules of energy, a pulse length of 2–6 nano seconds, and a wavelength tunable from 375–900 nm. Steering optics in laser assembly 131 allow fast and accurate beam alignment to a cross hair, fiduciary mark or positioning to an experimental target. A Z axis telescopic mechanism in laser assembly 131 allows the user to control the plane of ablation. A variable attenuator slide in laser assembly 131 provides incremental control of energy. Laser assembly 131 is described in more detail below.

Pulsed nitrogen laser 155 is coupled to dye cell holder 38 via fiber optic cable 157 and fiber optic ferrule 44. Laser 155 emits a pulse of laser light that travels through cable 157 to dye cell 36.

Dye cell 36 in turn emits a laser beam that travel through optic tube 128, focus tube 76, beamsplitter housing 78, microscope 134, and onto specimen plane 161. Dye cell 36 is reusable, and refillable with disposable dye.

Illumination light from an illumination source (not shown in FIG. 1) can be introduced into lamphouse port 86. Illumination light can also be introduced into lamphouse port 87 (not shown in FIG. 1) located on the opposite side of beamsplitter housing 78. This illumination light travels into microscope 134 and onto specimen plane 161. Light reflected from specimen plane 161 travels through optics in microscope 134 to viewing port 163 for viewing by a user or a camera.

Joystick 60 on optic tube 128 and joystick 61 on displacement tube 130 allow the user to align and steer the laser beam emitted from dye cell 36. Beam splitter plug 92 is visible through lamphouse port 86. Lamphouse port 86 is on the side of beam splitter housing 78. Beamsplitter direction knob 135, shown on top of beam splitter housing 78, allows the user to select illumination from lamphouse ports 86 or 87 simultaneous with laser illumination. FIG. 1 also shows bearing disc 124, the focus tube 76, the focus plate 74, the variable attenuator 122, and alignment screw 64.

Thus, a laser beam, generated in dye cell 36, is directed into microscope 134 by way of an epi-illumination port defined by flange 133 of microscope 134. Optics in laser assembly 131 make this laser beam coincident to the optical axis of microscope 134. Optics in laser assembly 131 shape this laser beam to come to a focus at the specimen plane 161 of microscope 134. The optics in laser assembly 131 aim and shape this laser beam to match the optics of microscope 134, to achieve a near diffraction-limited laser beam focused at the specimen plane 161.

Figure 2:
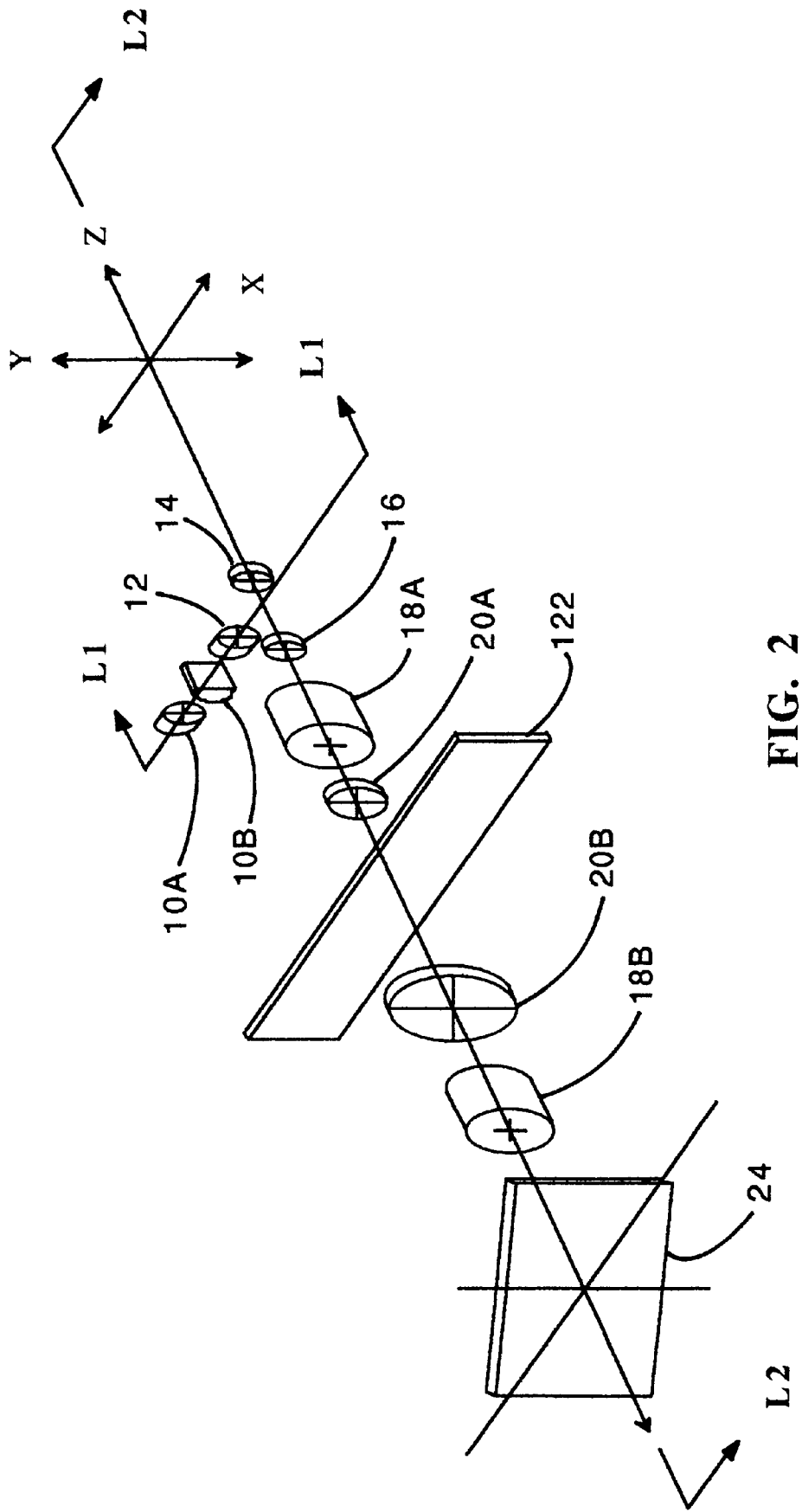
FIG. 2 is diagram emphasizing a relationship between some optical elements in the preferred laser assembly.

FIG. 2 emphasizes a relationship between some optical elements in laser assembly 131. Lens 10A and 10B of dye cell holder 38, and pump window 12 of dye cell 36, are positioned on the x-axis of FIG. 2 along the line L1—L1. Lens 10A, 10B, and pump window 12 are preferably made of fused silica. Lens 10A is a double convex lens and lens 10B is a piano-cylindrical lens, both of which are mounted in dye cell holder 38, as described in more detail below. Pump window 12 is an plane window in the shape of a disc. The remaining elements of FIG. 2 are positioned on and generally centered about the z-axis along line L2—L2 of FIG. 2.

Laser mirror 14 is nearly 100% reflective, and output coupler 16 is less reflective. Mirror 14 and output coupler 16 are flat surfaced and disc-shaped. Pump window 12, laser mirror 14, and output coupler 16 each define a wall portion of dye cell 36, as described in more detail below. The dye laser beam is generated between mirror 14 and output coupler 16, and passes out of dye cell 36 through output coupler 16.

First beam displacer 18A is a plane window. First telescope lens 20A is plano-convex or plano-concave. First beam displacer 18A, first telescope lens 20A, and variable attenuator 122 are mounted within optic tube 128 (FIG. 1). Beam displacer 18A rotates about the y-axis as well as the x-axis and acts to displace the dye laser beam in these two axes. Variable attenuator 122 translates along the x-axis of FIG. 2 and attenuates the dye laser beam.

Second telescope lens 20B is piano-convex and is located in the focus tube 76 and translates along the z-axis. The combination of telescope lenses serve to focus the dye laser beam at the image plane of microscope 134. Second beam displacer 18B is inside displacement tube 130 and functions in the same way as beam displacer 18A. Beam splitter 24 is a dichroic mirror and is located in beam splitter housing 78. Beam splitter 24 acts to transmit the dye laser beam while directing light from additional lamphouses along the path of the laser beam into microscope 134.

Figure 3A:
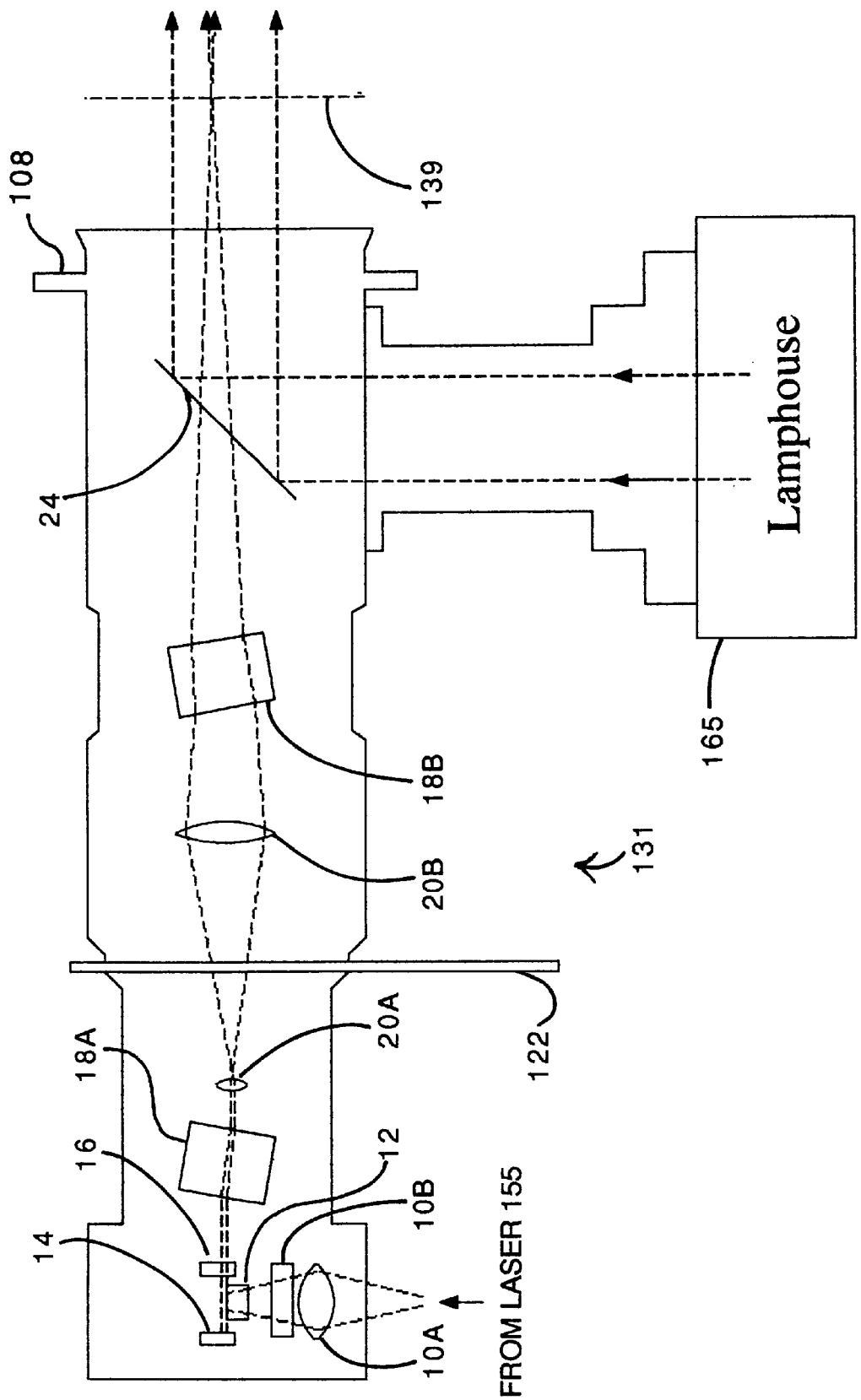
FIGS. 3A and 3B are a simplified diagram emphasizing some optical paths of the dye laser assembly and microscope shown in FIG. 1.
Figure 3B:
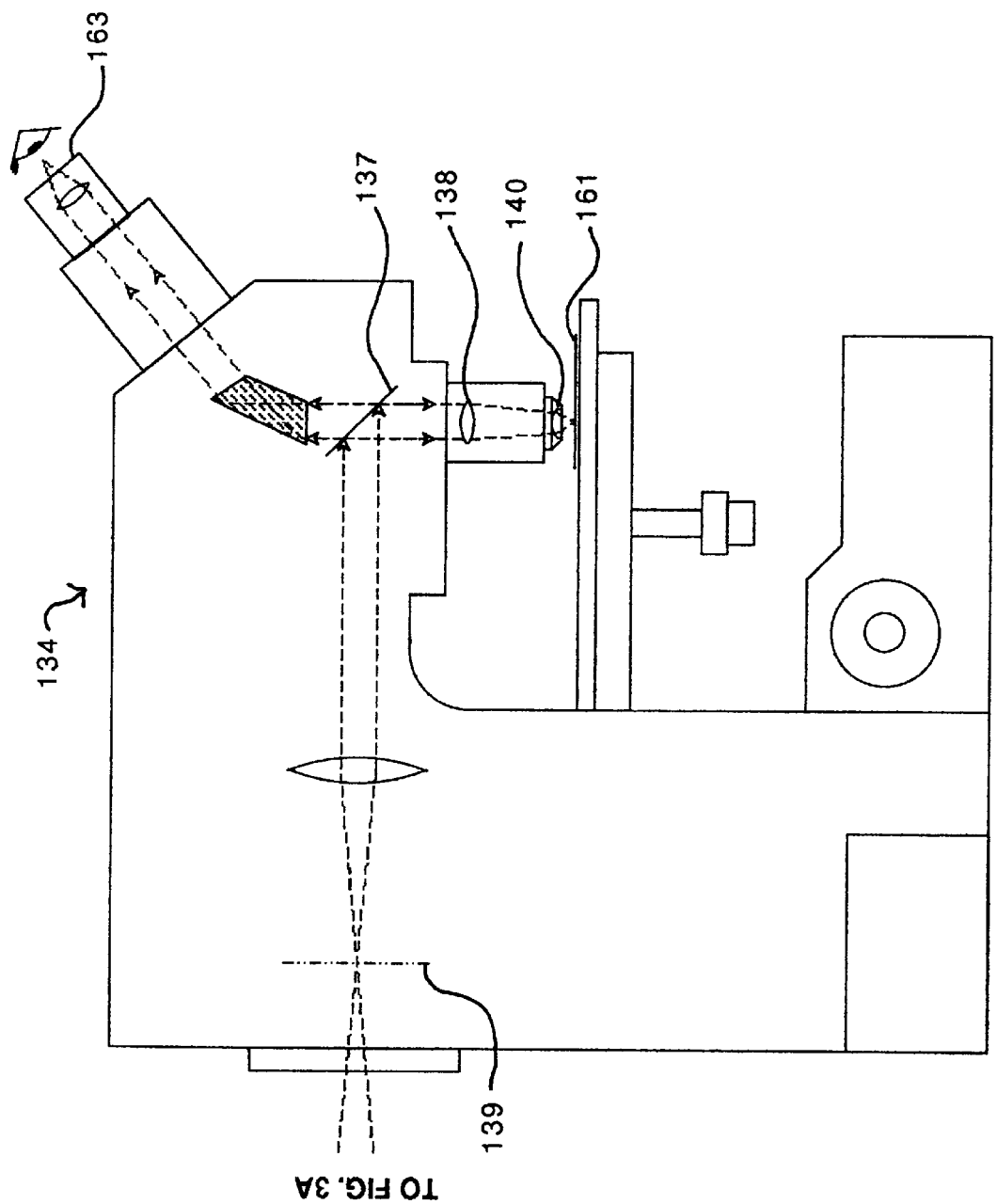

FIG. 3A and 3B are a simplified diagram emphasizing some optical paths in laser assembly 131 and microscope 134. Beam displacer 18A can be tilted via joystick 60, and beam displacer 18B can be tilted via joystick 61, to cause displacement of the beam in space. The dye laser beam passes through beam displacer 18A. Telescope lens 20A can be a positive lens and cause the beam to come to focus as shown here, or lens 20A can be a negative focus lens and cause the beam to diverge before entering telescope lens 20B which is typically a positive focus lens. The beam passes through the variable aftenuator 122, typically a variable neutral density filter. The beam passes through beam displacer 18B and then comes to focus near the rear image plane of microscope 134. The spatial location of this image plane is variable depending on microscope design, and is shown here to be internal to microscope 134 beyond the microscope flange 108. The laser beam may be shaped and focused by lenses in the microscope not shown here. The laser beam is reflected by a dichroic element 137 into the rear aperture 138 of the microscope objective and is focused at the specimen plane 161 by the front element 140 of the microscope objective. Light from the specimen plane is brought back through the dichroic element 137 and is focused at viewing port 163. By changing the focus of the telescope in laser assembly 131, the dye laser beam will come to focus at, above or below the image plane of the microscope.

Figure 4A:
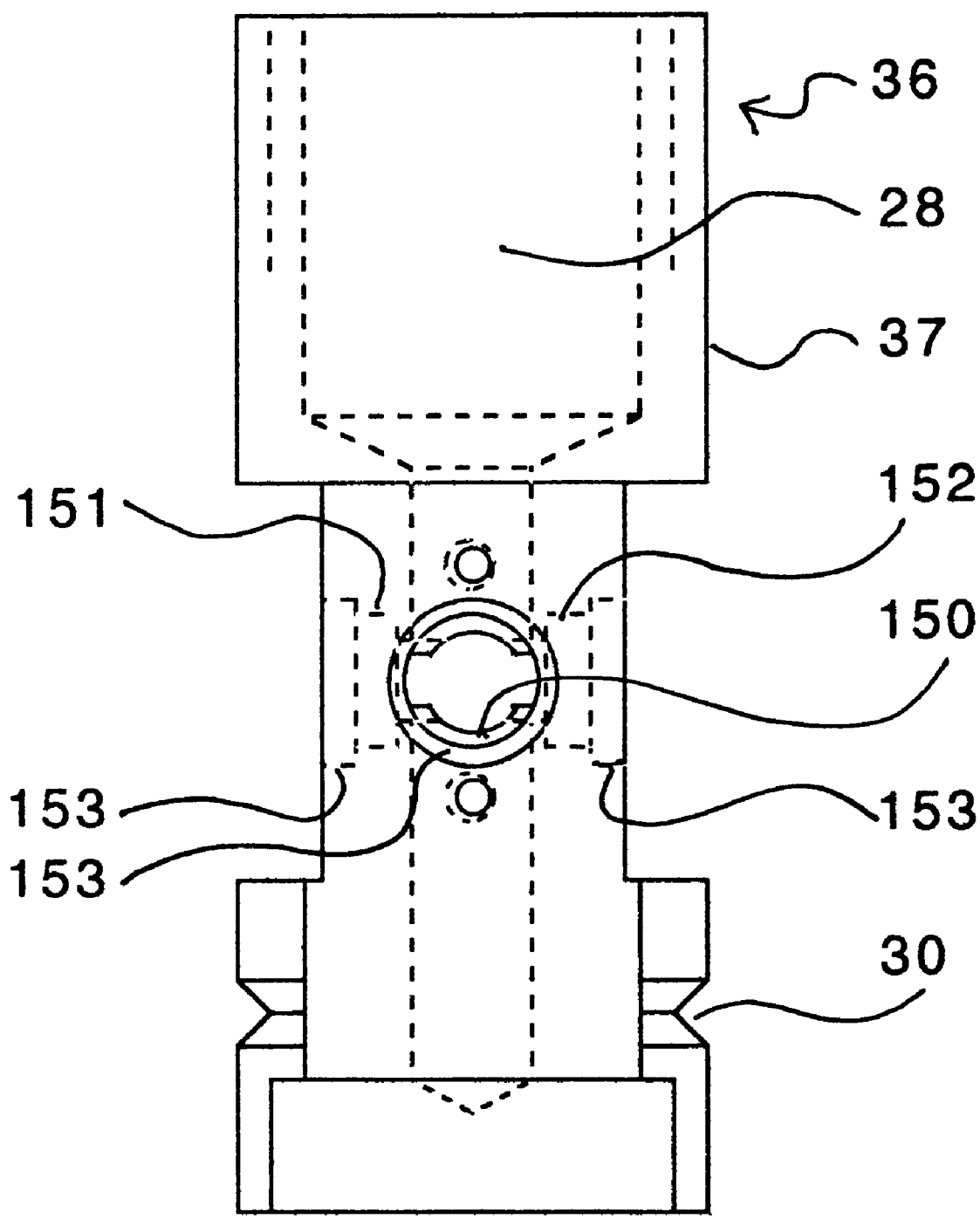
FIGS. 4A, 4B, 4C and 4D show the front, left side, right side and plan views, respectively, of the dye cell, in the preferred laser assembly.
Figure 4B:
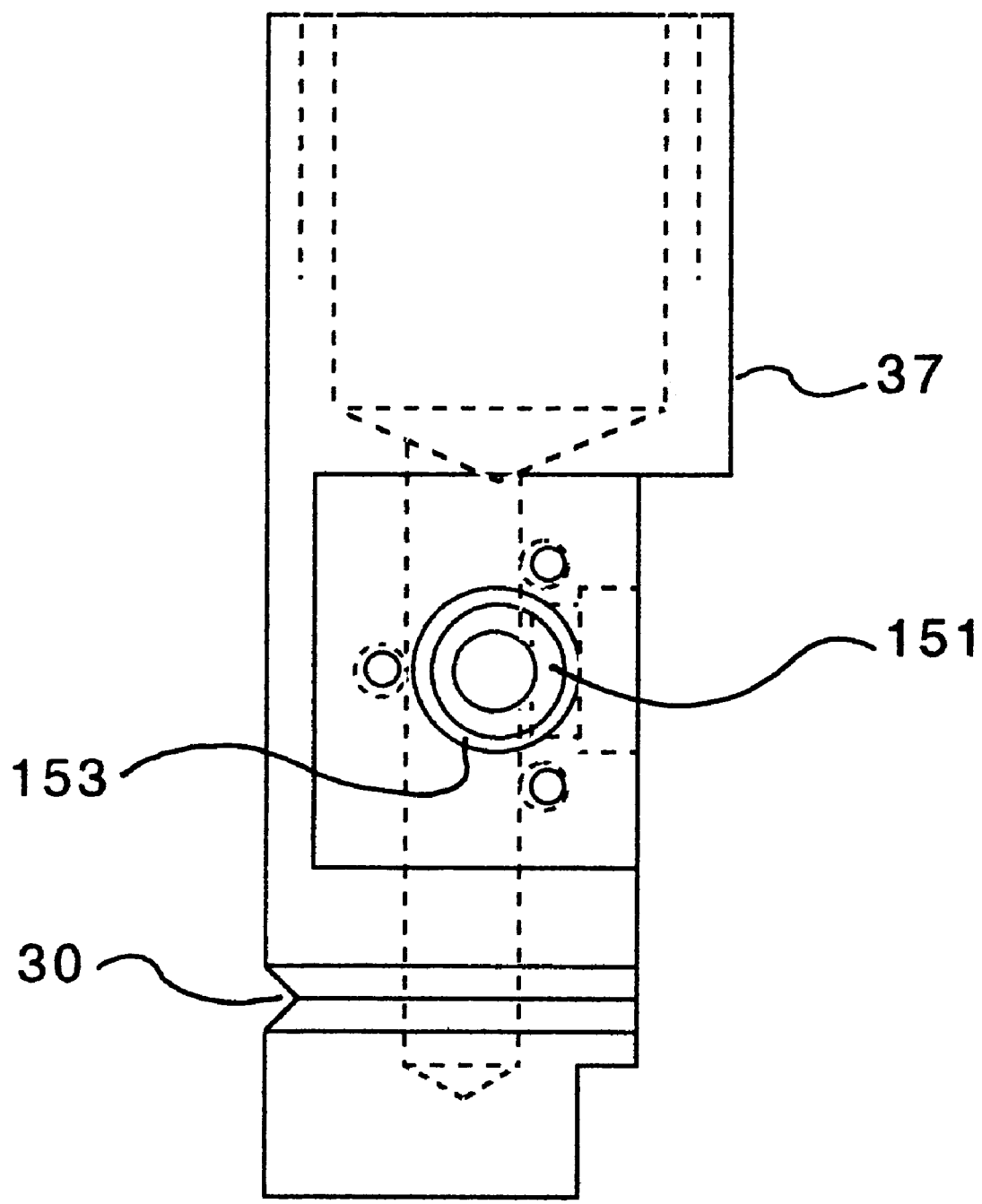
Figure 4D:
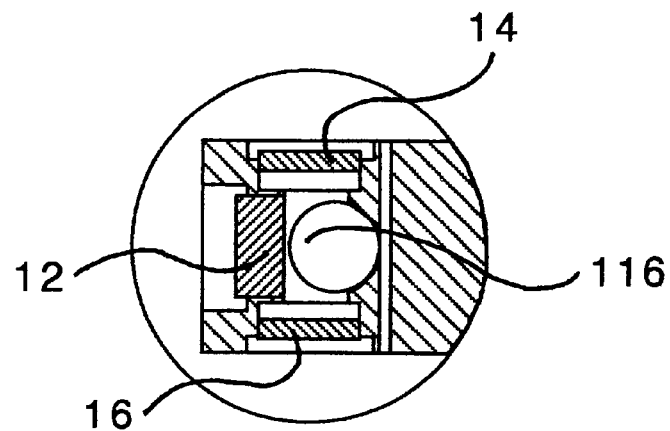
Figure 4C:
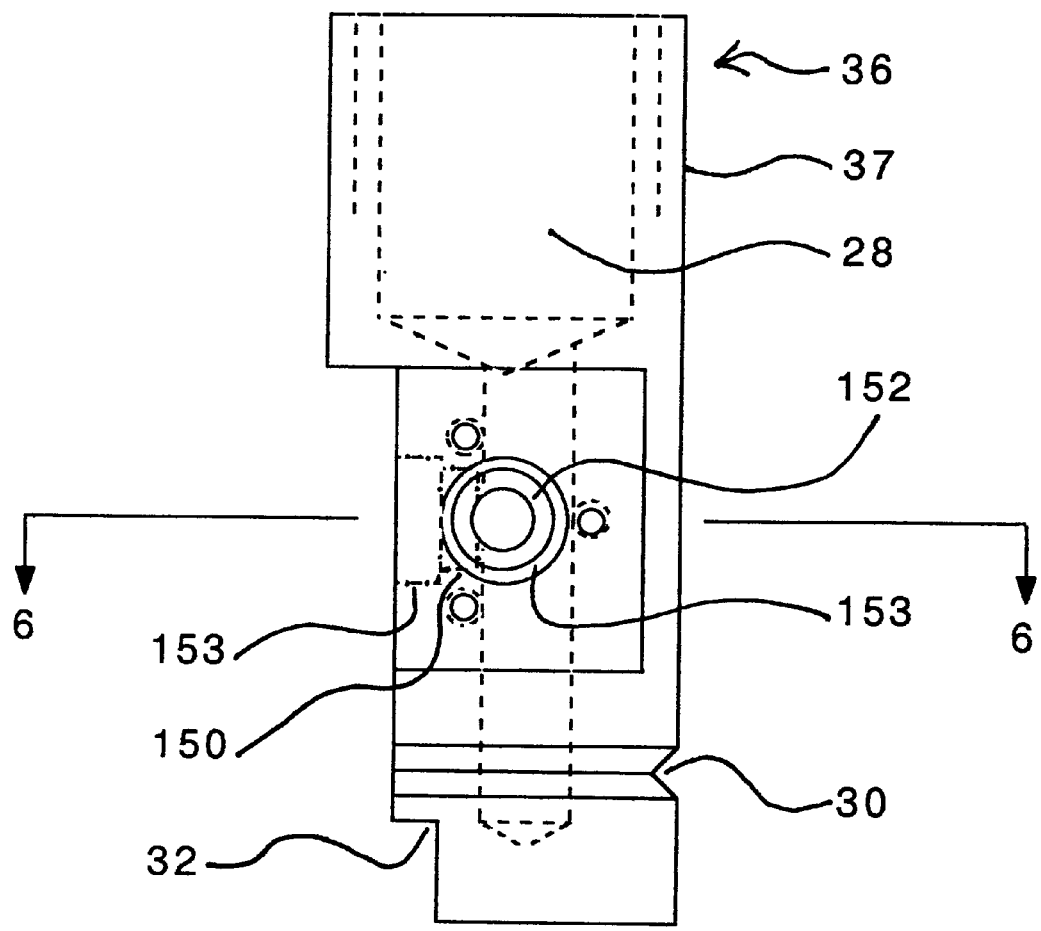
Figure 5:
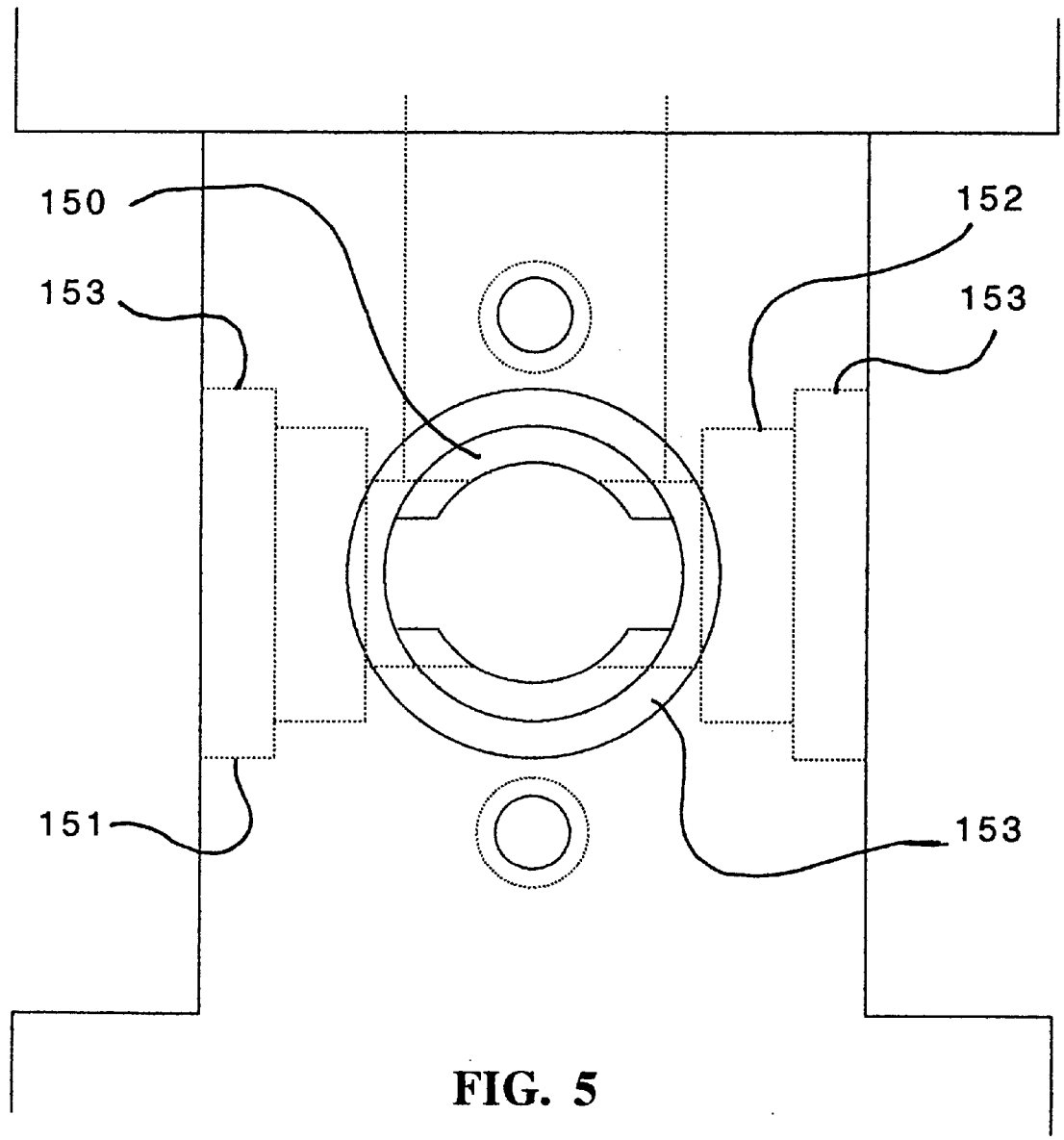
FIG. 5 is an enlarged view of part of the dye cell shown in FIG. 4A.
Figure 6A:
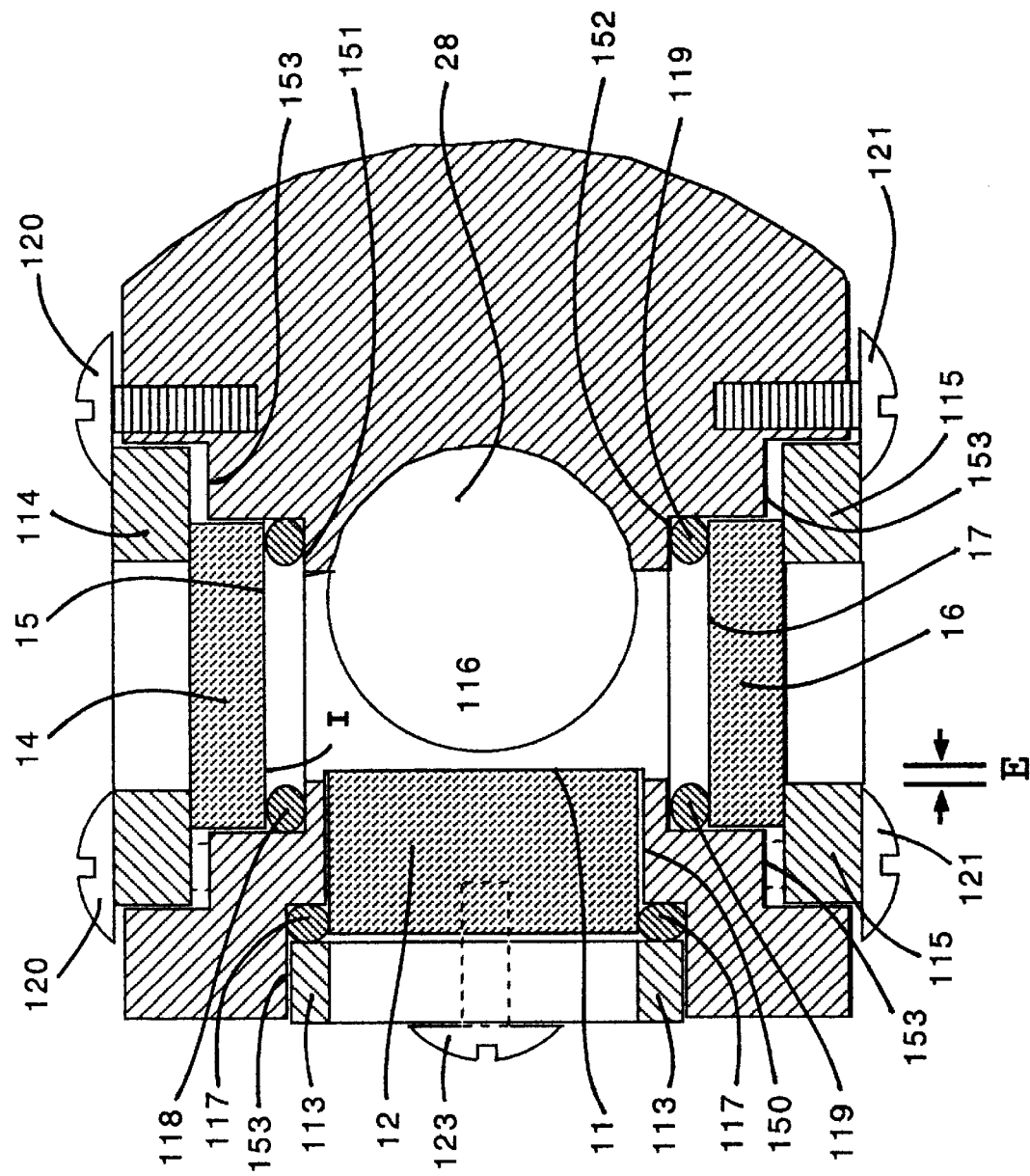
FIGS. 6A, 6B, and 6C show mounting mechanism for the optical elements of the dye cell.
Figure 6B:
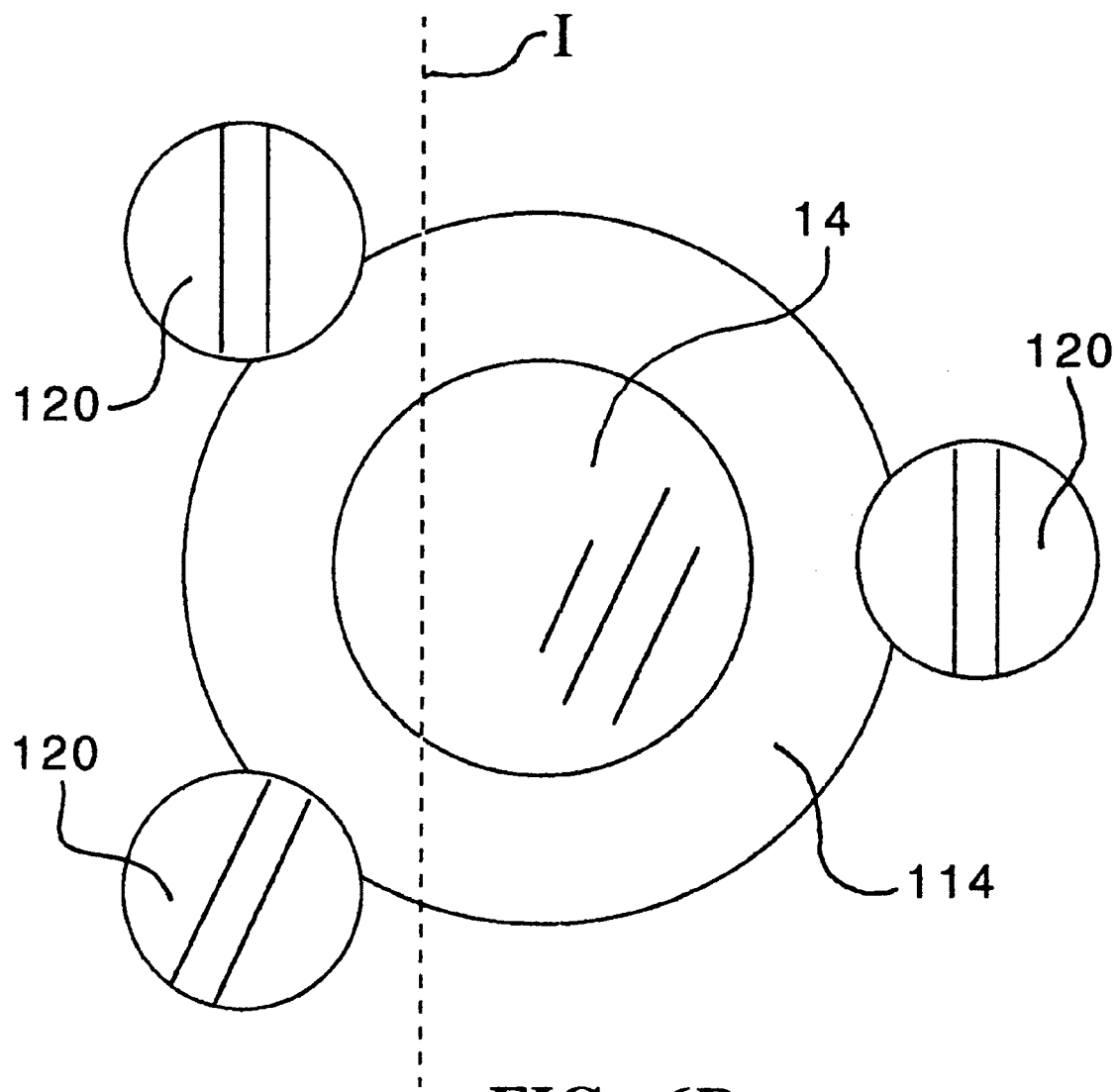
Figure 6C:
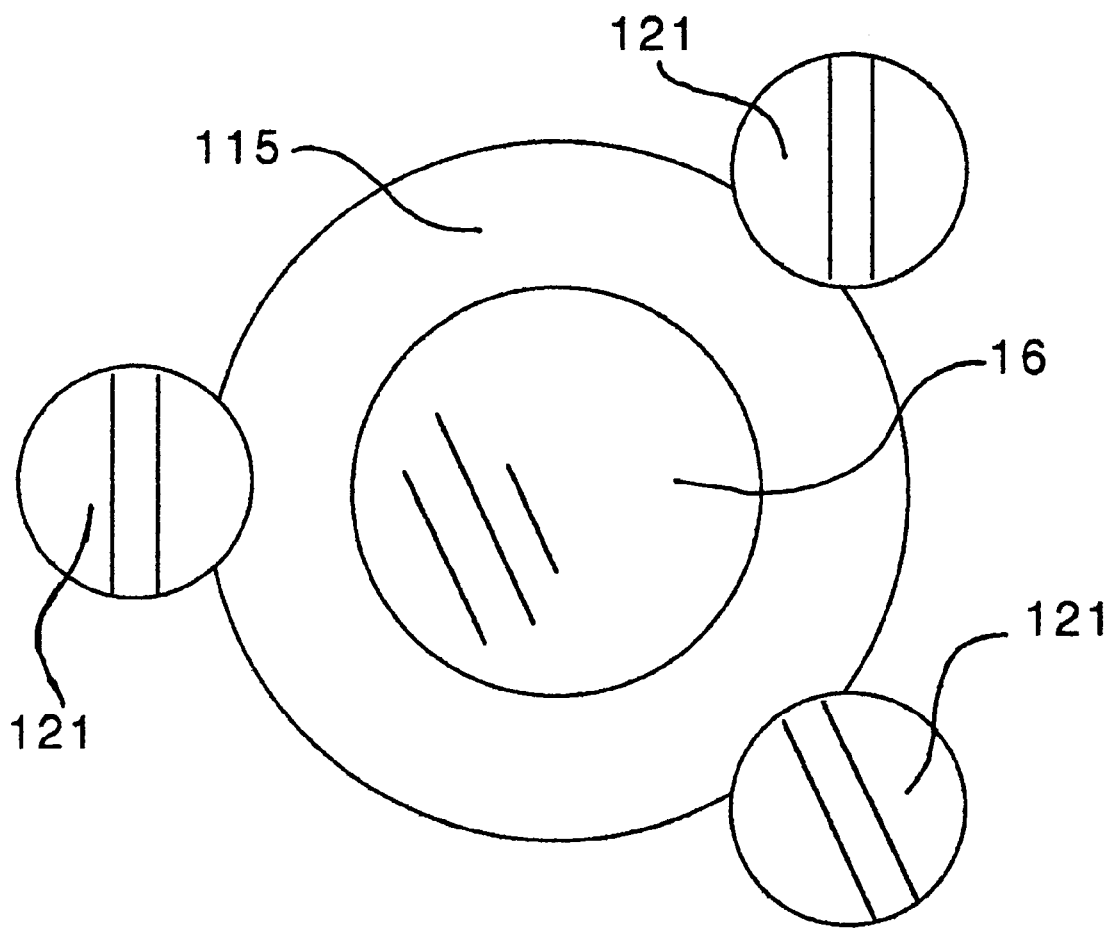

FIGS. 4A, 4B, and 4C show side, rear, and front views, respectively, of dye cell 36. FIG. 4D is a sectional view through the optical elements of dye cell 36. FIG. 5 is an enlarged view showing a section of the structure shown in FIG. 4A. FIG. 6A is a cross sectional view corresponding to the line 6—6 shown in FIG. 4C. FIG. 6B is a plan view emphasizing the mounting of mirror 14 in dye cell 36. FIG. 6C is a plan view emphasizing the mounting of output coupler 16 in dye cell 36.

Dye cell main body 37 is machined from a single piece of rod-shaped aluminum. As shown in FIG. 6A, each optical element is mounted at the flat bottom of a cylindrical bore containing a central round through bore and centered within a larger diameter counterbore. The pump window counterbore 150 is in a plane perpendicular to both output coupler counterbore 152 and laser mirror counterbore 151 both of which lie in planes parallel to each other. The region of dye cavity 28 is bounded on three sides by the three optical elements, defining an optical cavity 116 within the larger dye cavity 28. When a pump beam from cable 157 is focused into the cavity at the interior surface 11 of pump window 12 the elongated axis of the beam is perpendicular to laser mirror 14 and output coupler 16. When a solution of laser dye is present in dye cavity 28 the pump beam causes the dye to laser in the zone being illuminated within the optical cavity 116. Laser mirror 14 is preferably nearly 100% reflecting for greatest intensification while the output coupler 16 is less reflecting to permit the stimulated radiation, hereafter called the dye laser beam, to exit the dye cell.

Main body 37 defines a central dye cavity 28 for holding fluorescent laser dye. Alignment groove 30 extends around the circumference at the base main body 37. Positioning notch 32 on one side of the base of body 37 defines two perpendicular surfaces. Alignment groove 30 and positioning notch 32 together act to position dye cell 36 within holder 38, for precise alignment of dye cell 36 relative to fiber optical ferrule 44 and the optics of microscope 134.

Pump window 12, laser mirror 14 and output coupler 16 define part of the walls of dye cavity 28. Structures on dye cell 36 for mounting pump window 12, laser mirror 14, and output coupler 16 are described below.

On each of three sides of body 37 there is a hole drilled through the wall into dye cavity 28. Surrounding and concentric with each hole is a small counterbore—the pump window counterbore 150, the mirror counterbore 151 and the output counterbore 152—each having a flat bottom. The pump window counterbore 150 is deep enough into the wall of the dye cell so that it partially breaks into the through holes from the other two sides. Therefore, the bottom of pump window counterbore 150 is discontinuous on the lateral sides, as shown in face-on view in FIG. 4A, FIG. 5, and in sectional view in FIG. 6A.

The bottoms of the other two counterbores (151 & 152) are continuous annular shapes. Surrounding and concentric with each small counterbore mentioned above is a large counterbore 153. FIG. 4D shows a sectional view of the optical elements situated in their respective counterbores.

FIGS. 6A, 6B, and 6C show mounting arrangement for pump window 12, and mirrors 14 and 16 in more detail. The mounting arrangement for mirror 14 includes a rubber O-ring 118, similar in diameter to mirror 14. O-ring 118 is placed on the bottom of a counter bore 151. Mirror 14 is then placed on top of O-ring 118 and metal ring 114 is placed on top of mirror 14. Metal ring 114 fits inside of large counterbore 153. The inner diameter of metal window ring 114 is smaller than the outer diameter of mirror 14. Window ring 114 is held in place by three mounting screws 120 threaded into dye cell 36. Compression of the 0-ring between mirror 14 and the mounting seat creates a seal preventing laser dye from leaking out of dye cavity 28. A face-on view of this assembly is shown in FIG. 6B.

The mounting mechanism for output coupler 16 is similar to that of mirror 14 described in the previous paragraph. Rubber O-ring 119 is placed on the bottom of counterbore 153. The inner diameter of metal window ring 115 is smaller than the outer diameter of output coupler 16. Window ring 115 is held in place by three mounting screws 121 threaded into dye cell 36. Compression of O-ring 119 between output coupler 16 and the aluminum frame creates a seal preventing laser dye from leaking out of dye cavity 28.

To mount pump window 12, pump window 12 is placed on the bottom of the pump window counterbore 150. O-ring 117 of larger diameter is placed on top of the window in the large counterbore 153, and metal window ring 113 is placed on top within counterbore 153. This assembly is held in place by two mounting screws. This assembly is shown in cross section in FIG. 6A.

The mounting mechanism described above also serves as a mechanism to align two of the optical elements of dye cell 36. For laser mirror 14, three mounting screws 120 are arranged equal distance apart around the periphery of window ring 114. By separately adjusting tension on each of screws 120, the planar surfaces of mirror 14 can be tilted in two axis due to the compression of 0-ring 118.

For output coupler 16, three mounting screwing 121 are arranged equal distance apart around the periphery of window ring 115. By separately adjusting tension on each of screws 121, the planar surfaces of output coupler 16 can be tilted in two axis because of the compression of O-rings 119.

Pump window 12 mounted directly on the aluminum frame, it is secured with two mounting screws 123, and cannot be tilted. Pump window 12, therefore, provides the alignment datum for dye cell 28.

The alignment of each optical element is critical. The planar surface of the pump window 12 must be perpendicular to the axis of the pump beam and perpendicular to the planar surfaces of both the laser mirror 14 and the output coupler 16, which must be parallel to each other. When the mounting surfaces are machined with precision, the degree of alignment provided by the O-rings, 118, and 119 is more than adequate.

In summary, dye cell 36 includes mirror 14 (a first mirror) and output coupler 16 (a second mirror) opposed to the first mirror. The second mirror is partially reflective for emitting radiation to the outside of dye cell 36. Pump window 12 is essentially a window for receiving radiation from outside dye cell 36, the window having a major surface perpendicular to the first and second mirrors. These first and second mirrors and the window define a dye cavity 28 for containing a liquid. This window defines an interior surface 11 extending past counterbore 150 and into the liquid cavity 28 by a distance E (FIG. 6A).

Because the interior surface 11 of pump window 12 extends into dye cavity 28, a plane defined by surface 11 intersects a plane defined by interior surface 15, of mirror 14, along a line I (FIG. 6B and 6A). Mirror 14 is parallel to output coupler 16 along this line 1. Thus, dye laser light generated directly adjacent to surface 11 receives the benefit of efficient reflection between mirror 14 and output coupler 16. Thus, dye cell 36 is more efficient than certain prior art, laterally pumped, dye cells that have the interior surface of the pump window delimited by a rounded edge connected to the mirrors or to other windows.

Aluminum body 37 is essential a frame for dye cell 36. Window ring 114 is essentially a first fastener juxtaposed to mirror 14, such that mirror 14 is between window ring 114 and aluminum body 37. Screws 120 act to bias window ring 114 towards mirror 14. The three screws 120 together act as an adjustable mechanism for applying a first mechanical force to a first location (the location of a first one of screws 120) on fastener 114, for applying a second mechanical force to a second location (the location of a second one of screws 120) on fastener 114, and for applying a third mechanical force to a third location (the location of a third one of screws 120) on fastener 114. These three different mechanical forces are achieved by tightening respective screws 120 a differing amount, thereby orienting mirror 14 in two axis.

Window ring 115 is essentially a second fastener juxtaposed to output coupler 16, such that coupler 16 is between window ring 115 and aluminum body 37. Screws 121 act to bias window ring 115 towards coupler 16. The three screws 121 together act as an adjustable mechanism for applying a first mechanical force to a first location (the location of a first one of screws 121) on fastener 115, for applying a second mechanical force to a second location (the location of a second one of screws 121) on fastener 115, and for applying a third mechanical force to a third location (the location of a third one of screws 121) on fastener 115. These three different mechanical forces are achieved by tightening respective screws 121 a differing amount, thereby orienting coupler 16 in two axis.

Figure 7D:
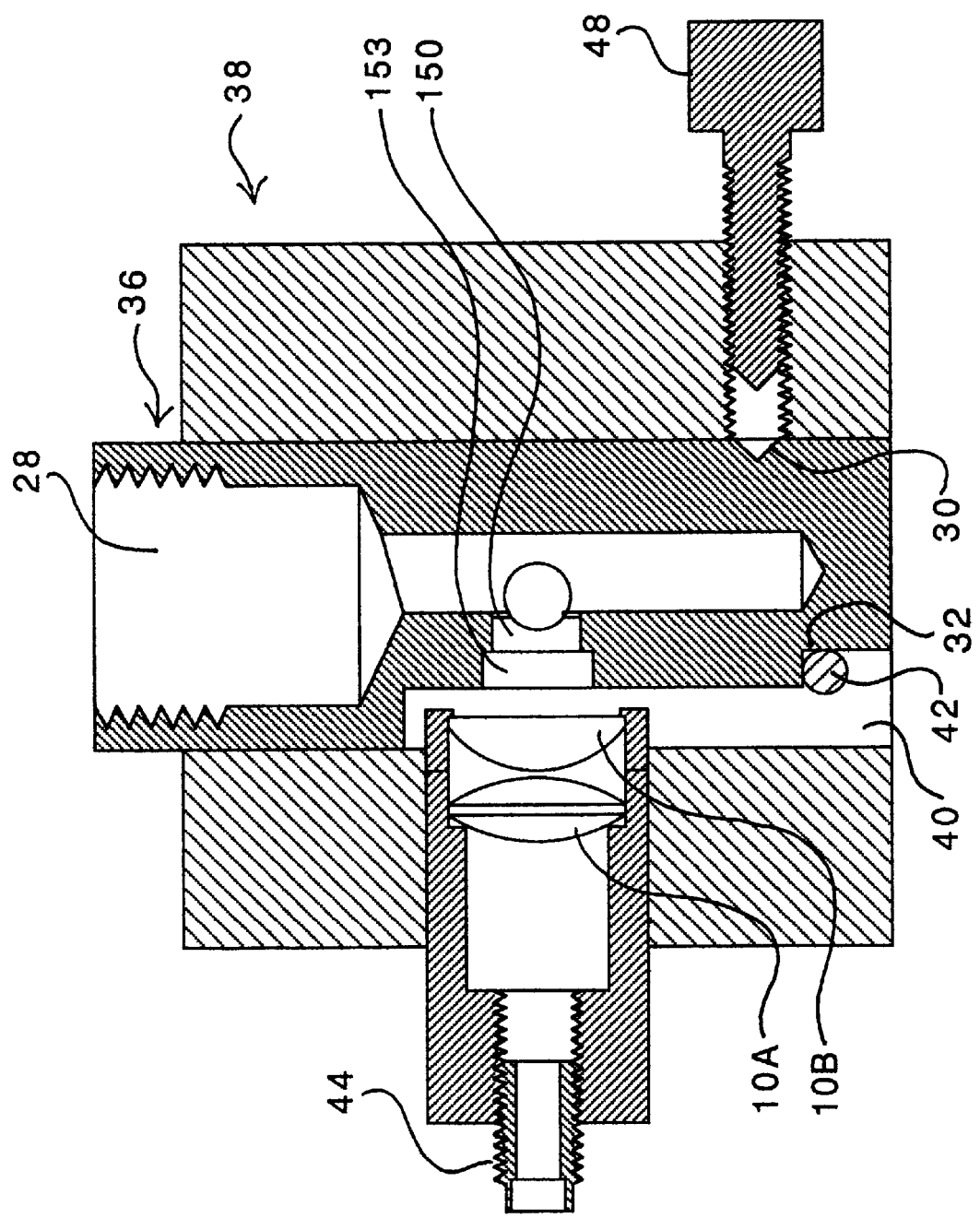

FIG. 7A, 7B, 7C and 7D show a front, top, side and sectional view of dye cell holder. Dye cell holder 38 defines a slot 40 for holding dye cell 36 and a front aperture 46. Dye cell holder 38 includes a dowel pin 42 for positioning dye cell 36, and a fiber optic ferrule 44 for receiving a fiber optic cable from an external pump source. FIG. 7D is a sectional view, corresponding to the along line L1—L1 of FIG. 5B, showing dye cell 36 secured in dye cell holder 38. Dye cell 36 fits snugly in slot 40 and when thumbscrew 48 is tightened into alignment groove 30 the dye cell is forced against dowel pin 42.

FIG. 7D also shows the relationship between lens 10A, lens 10B, pump window counterbore 150, and dye cavity 28. In particular, the bottom of pump window counterbore 150 is shown overlapping the through hole for the output coupler.

Alignment of dye cell 36 in the dye cell holder 38 is simple. Dye cell 36 is placed in slot 40 and is turned such that positioning notch 32 is pressed down against dowel pin 42. As shown in FIG. 7D, alignment notch 30 is machined such that when the dye cell is placed loosely into the dye cell holder the center of groove 30 is positioned slightly higher than the pointed tip of thumbscrew 48. When the tip of thumbscrew 48 is tightened into alignment notch 30 it forces the positioning face 32 into and down upon dowel pin 42. In this manner, the dye cell is effectively secured in six-axis spatial alignment relative to the dye cell holder. Dye cells can be removed and replaced in the dye laser system without need for any manual alignment other than tightening the thumbscrew.

Thus, the preferred system allows a user to observe a magnified image of an object at the specimen plane 161, and to project laser radiation from dye cell 36 onto the object at a location corresponding to the image. Microscope 134 includes a first optical path (through flange 133, dichroic element 137, rear aperture 138, and front element 140) for projecting light onto the object, and a second optical path (front element 140, rear aperture 138, and viewing port 163) for receiving light reflected from the object and focusing the received light. Laser assembly 131 is removably attached to the first optical path via flange 108. Laser assembly 131 includes a dye cell 38 defining a cavity 28 for containing a liquid. Dye cell holder 38 includes a wall defining a cavity for receiving the dye cell, a ferrule 44 (a connector), attached to the wall, for removably attaching to optical cable 157. Screw 48 is essentially a mechanism for biasing dye cell 36 against the wall of holder 38, to align pump window 13 with the cable 157 and to align the output coupler 16 with the first optical path of microscope 134.

Dye cell 36 defines alignment groove 30 (a concave portion) and the screw 48 defines a convex portion for engaging with groove 30.

Because the center of groove 30 is slightly higher than the pointed tip of thumb screw 48, before thumb screw 48 engages groove 30, screw 48 acts as a biasing mechanism configured to bias dye cell 36 in a down direction (transverse to the wall of holder 38), as well as in a lateral direction (against the wall of holder 38).

Ports 86 and 87 act to receive illumination light from a lamphouse and beam splitter 24 acts to align the illumination light with the first optical path of the microscope.

Figure 8:
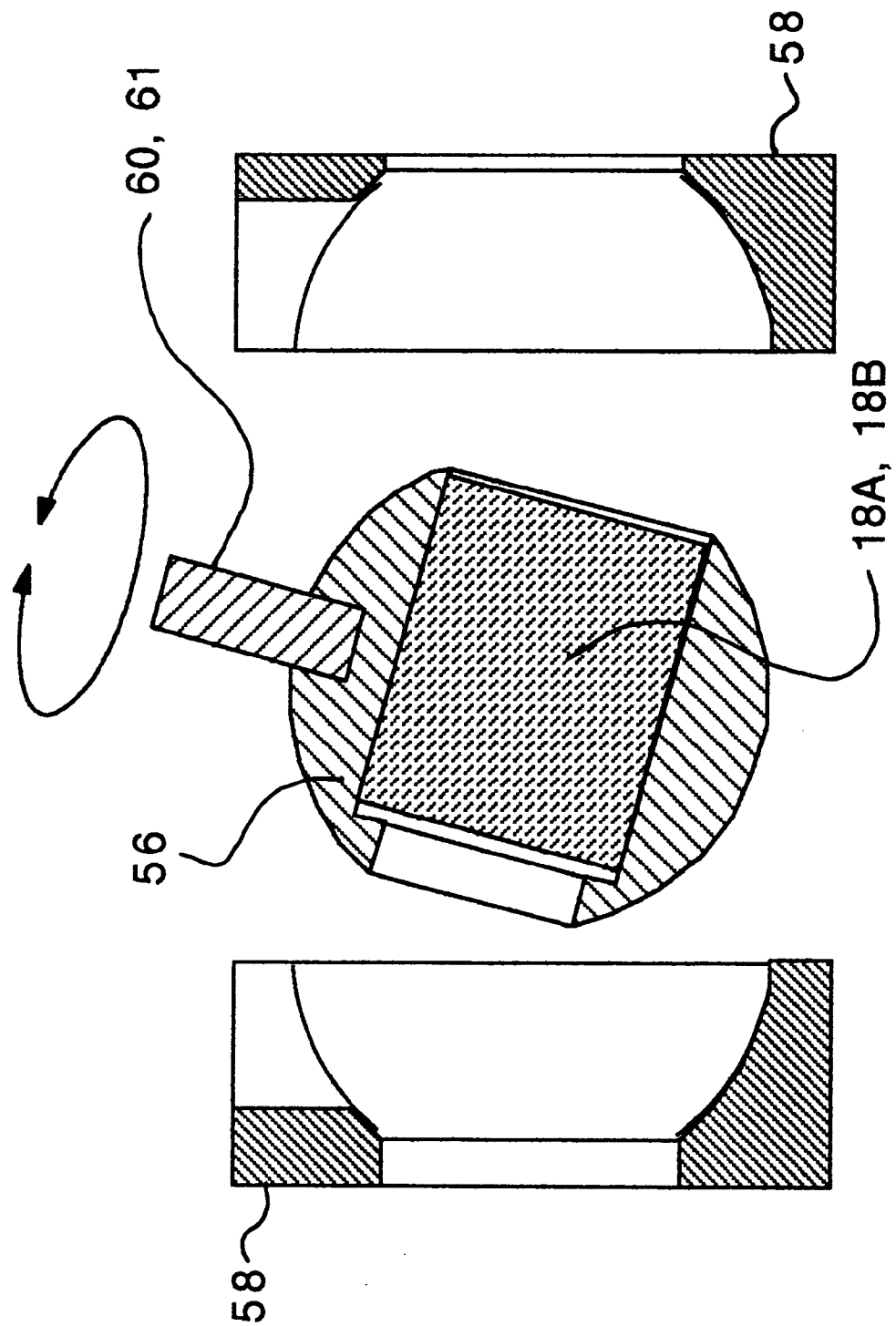
FIG. 8 is a sectional view of a beam displacement assembly.

Beam displacer 18A is located in optic tube 128 and beam displacer 18B is located in displacement tube 130. FIG. 8 shows a sectional view representing both beam displacement assemblies. Beam displacer 18A (or 18B) is mounted in a hole drilled through a ball bearing 56. Ball bearing 56 is held between two bearing cups 58 which have an inner radius the same as the outer radius of ball bearing 56. Bearing cups 58 have a central hole to allow passage of the laser beam and a notch at the top to allow movement of joystick 60 (or 61). In addition, the bearing cups 58 are preferably made of a low friction material such as PTFE to enable ball bearing 56 to be rotated freely in two axes by joystick 60 (or 61). Tilt in one axis is shown by the position of the beam displacer in FIG. 8. Tilt in the other axis is represented by the line with two arrowheads. Beam displacement assemblies are mounted in the body of laser assembly 131 to provide enough tension on ball bearing 56 to prevent it from rotating spontaneously. Beam displacement assemblies serve to align the axis of the dye laser beam with the axis of the first optical path of microscope 134 and to translate the focused dye laser beam at the image plane of microscope 134.

Figure 9:
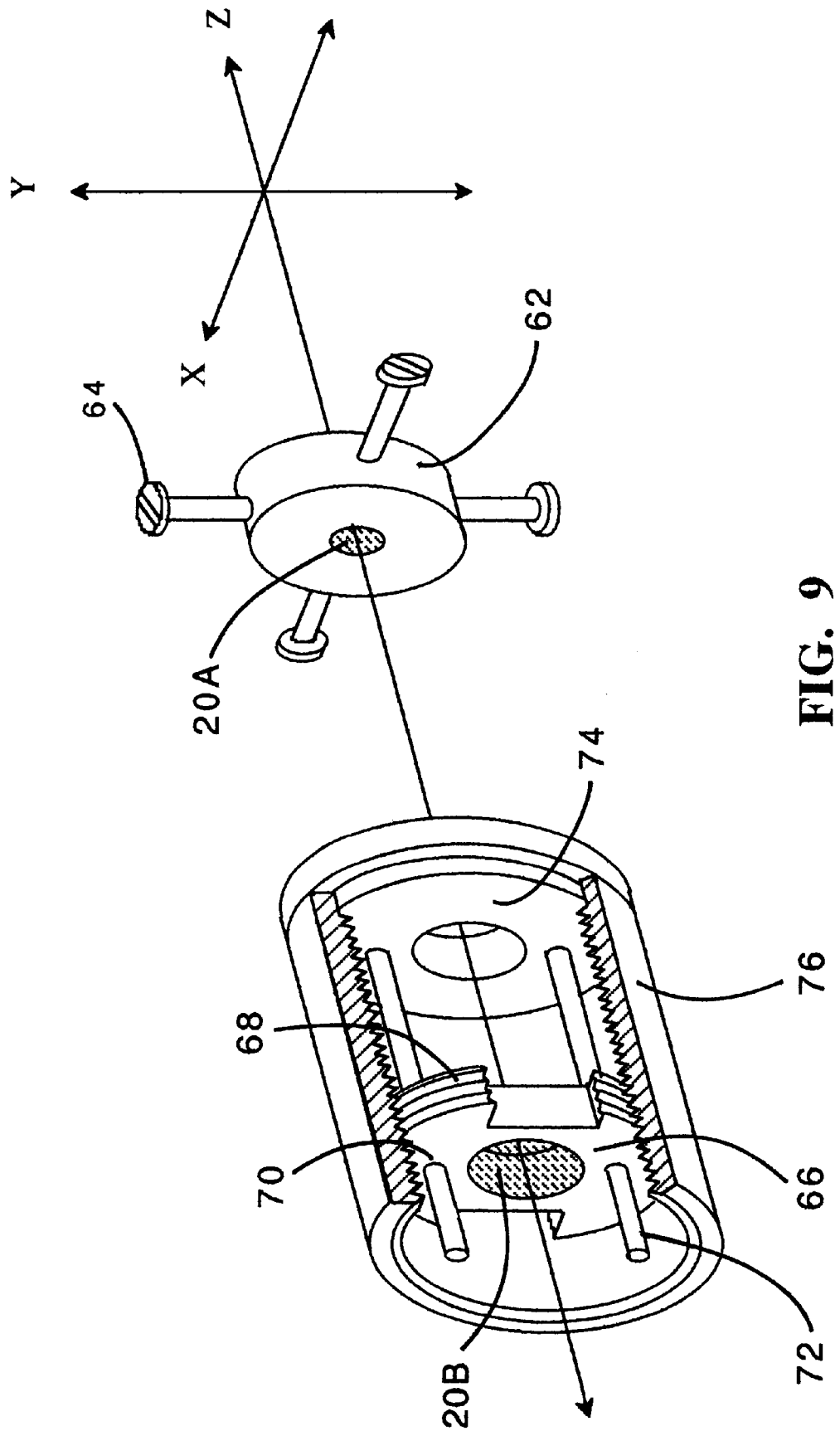
FIG. 9 shows diagrammatically the operation of the telescope.

FIG. 9 shows diagrammatically the operation of the telescope. Telescope lens 20A is mounted in a hole in a lens translator 62 which is held in place in the body of the laser by four alignment screws 64 which extend through the optic tube 128 (not shown) to the outside of the body. The heads of the alignment screws 64 are tightened to exert force upon the body, thereby holding lens translator 62 in place. Telescope lens 20B is mounted in a hole in the focus translator 66 which has mechanical threads 68 on its outermost surface and is threaded inside focus tube 76 shown in cut-a-way fashion which has matching internal threads. Lens translator 62 has two holes 70 in which rubber O-rings (not shown) are cemented and through which pins 72 are allowed to slide. Pins 72 are pressed into a focus plate 74 and held rigidly in place. Focus plate 74 has a central hole for passage of the laser beam. Focus tube 76 is held in place by pressure from ball plungers on bearing disc 124 (not shown) in contact with the front rim of focus tube 76 pushing it against focus plate 74. Focus tube 76 can be rotated about the z-axis causing the focus translator 66 to move along the z-axis sliding upon the pins 72.

Figure 10C:
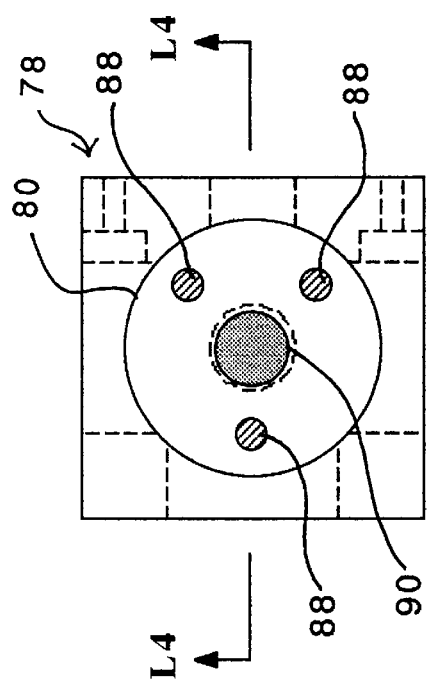
FIGS. 10A, 10B and 10C show a front, mid-sectional and top view respectively of a beam splitter housing.
Figure 10B:
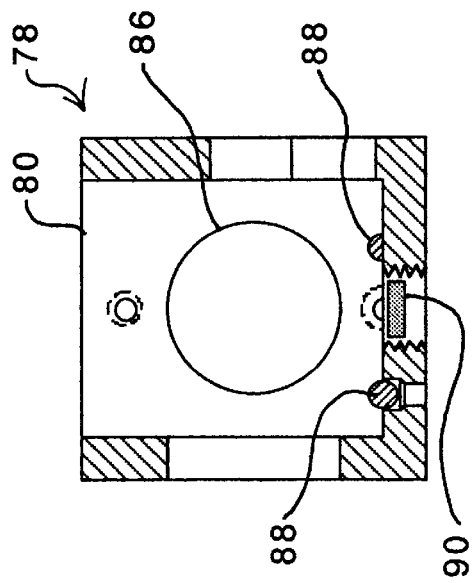
Figure 10A:
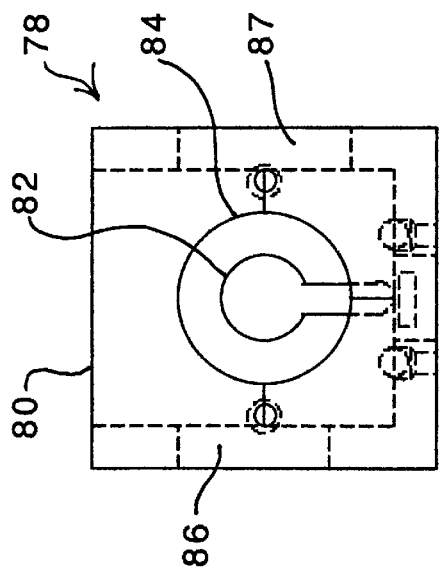

FIGS. 10A, 10B and 10C show front, mid-sectional, and plan views respectively of beam splitter housing 78 which is essentially a hollow block containing holes bored through five sides. As shown in FIG. 10A, these holes are a plug bore 80, a beam entrance aperture 82, a beam exit aperture 84, and two lamphouse ports 86 and 87. FIG. 10B is a sectional view along line L4—L4 of FIG. 10C. Mounted on the bottom of the plug bore 80, shown in FIG. 10C as viewed from above, are three steel balls 88 and a magnet 90, all of which are partially recessed into the base of beam splitter housing 78 as shown in the sectional view in the bottom of FIG. 10B. Magnet 90 is preferably disc-shaped, magnetized on the large dimension and of high energy density.

Figure 11C:
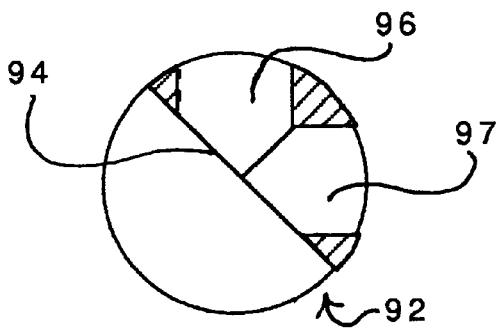
FIGS. 11A, 11B, 11C and 11D show front, side, mid-sectional and bottom views, respectively, of a beam splitter plug.
Figure 11A:
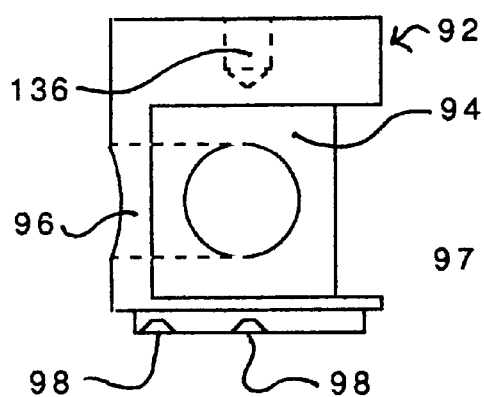
Figure 11B:
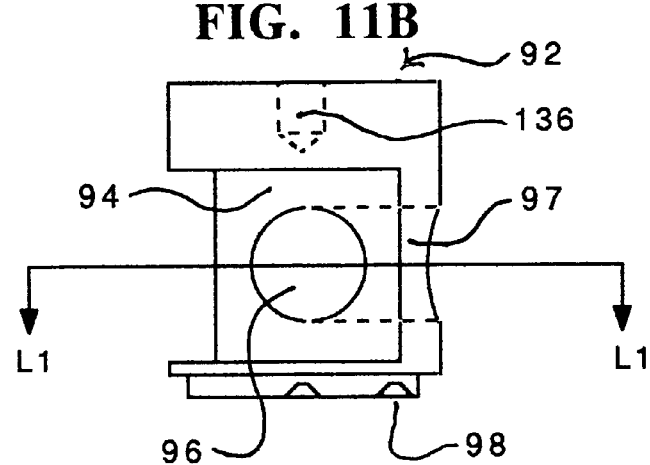
Figure 11D:
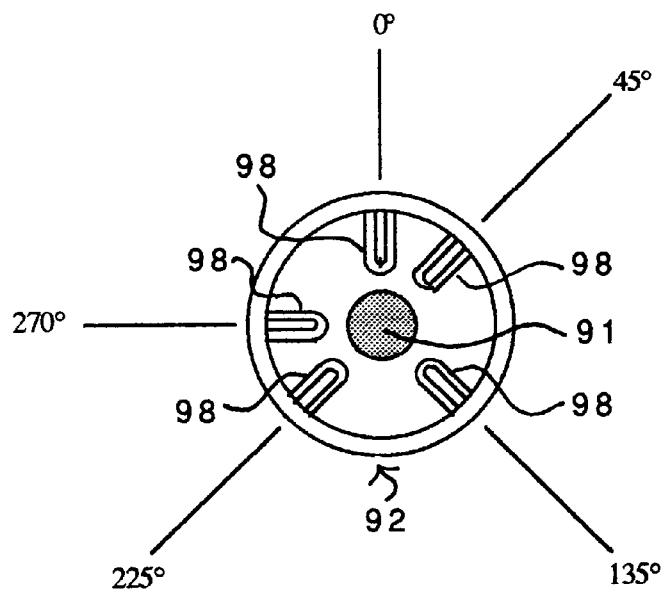

FIGS. 11A, 11B, 11C and 11D show front, rear, mid-sectional, and bottom views, respectively, of a beamsplitter plug 92. Beamsplitter plug 92 is cylindrical in shape with a flat machined surface, a mirror face 94, for mounting a dichroic mirror 24 (not shown) or similar reflector. A hole, the knob bore 136, is drilled in the top for attachment of the beamsplitter control knob 137 (shown in FIG. 1). Two laser apertures, 96 and 97, are bored ninety degrees relative to each other into either side of beamsplifter plug 92 and come to confluence near the midsection at mirror face 94, as shown in FIG. 11C which is a midsectional view along line L1—L1 of FIG. 11B. There are grooves 98 in the bottom of beamsplitter plug 92, as shown in FIGS. 11A and 11B. The angular orientation of the five grooves 98 is indicated diagrammatically in FIG. 11D. Also shown in FIG. 11D is magnet 91 mounted in a recess in the bottom of beamsplitter plug 92.

The beamsplitter housing 78 and beamsplitter plug 92 function together as an assembly to pass the dye laser beam into microscope 134, and to receive illumination from additional sources and pass that light into microscope 134. Beamsplitter plug 92 will be stable inside housing 78 in only three orientations. Two of the positions allow use of both laser and additional illumination, while the third position blocks all illumination. In position one, laser aperture 96 is at the rear of housing 78 and mirror face 94 is at an angle of 45° relative to the path of the incident dye laser beam (Z-axis of FIG. 2). With reference to FIGS. 10A and 11C, the laser beam will pass through beam entrance aperture 82 of housing 78, then through laser aperture 96 of plug 92, through beam exit aperture 84 of housing 78, and into microscope 134 (FIG. 1). Also, additional illumination can pass through lamphouse port 86 on the side of housing 78, will be reflected by a dichroic 24 attached to face 94 of plug 92, and will be directed through exit aperture 84 of housing 78, and into microscope 134, co-incident with the dye laser beam.

In position two, plug 92 is rotated 90°, laser aperture 97 is at the rear of housing 78 and mirror face 94 is at an angle of 45° to the path of the laser beam but rotated 900. With reference to FIGS. 10A and 11C, the laser beam will pass through the beam aperture 82 of housing 78, then through aperture 97 of plug 92, through beam exit aperture 84 of housing 78, and into microscope 134. Also, additional illumination can pass through lamphouse port 87 on the side of housing 78, will be reflected by a dichroic 24 attached to face 94 of plug 92, and will be directed through exit aperture 84 of housing 78, and into microscope 134, co-incident with the dye laser beam.

In position three, plug 92 is rotated a further 135° bringing mirror face 94 perpendicular to the laser beam and facing the beam entrance aperture 82 of housing 78. The laser beam will be absorbed by the body of plug 92. No illumination will be possible from ports 86 or 87 of housing 78. With a further rotation of 135° plug 92 is returned to position one.

Positioning of the beamsplitter plug, as described above, is done with precision and repeatability by the combination of grooves, balls, and magnets, as follows. Grooves 98 on the bottom of plug 92 (FIG. 11D) engage balls 88 on the floor of housing 78. This engagement occurs only when plug 92 is in positions one, two or three as described above. Magnet 90 in the floor of housing 78 and magnet 91 in the base of plug 92 are magnetized on their broad surfaces and are of opposite polarity. Magnetic attraction between the opposing poles of magnets 90 and 91 holds the beamsplitter plug 92 securely inside the beamsplitter housing 78. With finger pressure upon the beamsplitter direction knob 135, the user is able to rotate plug 92 out of one position and have the plug "lock" into another position. Magnetic attraction provides retention, while the ball and groove design provides positive and repeatable positioning of the beamsplitter plug 92. This beamsplitter assembly design for the dye laser system allows simple and quick switching between illumination sources and allows simple and quick exchange of beamsplitter plugs 92 containing different types of dichroic mirrors mounted on mirror face 94.

Figure 12B:
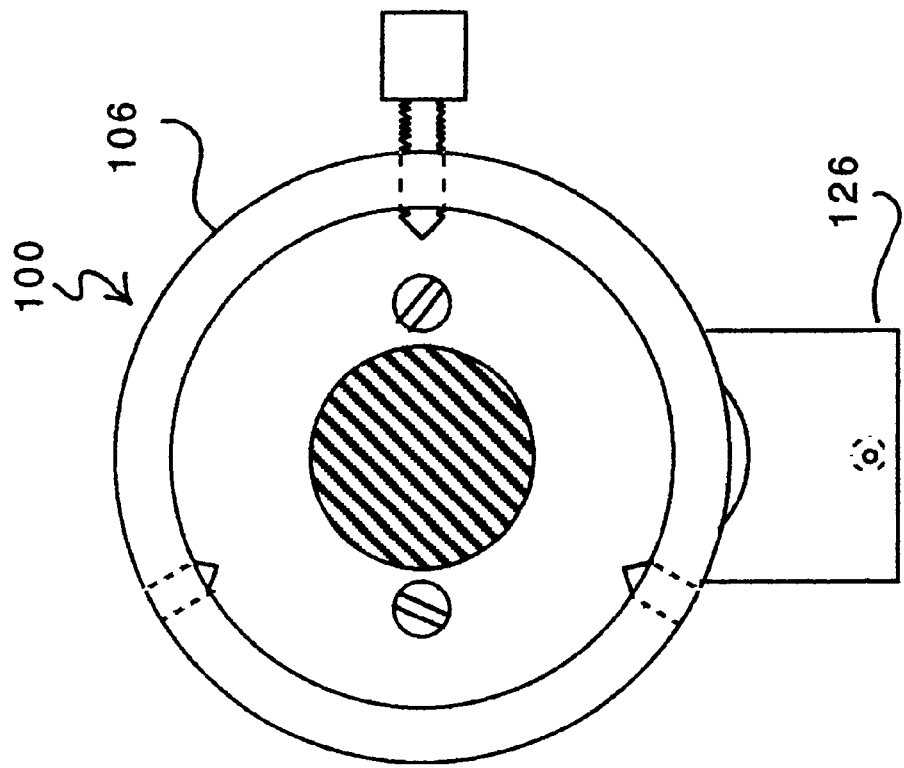
FIGS. 12A and 12B show the side and end views of a lamphouse assembly.
Figure 12A:
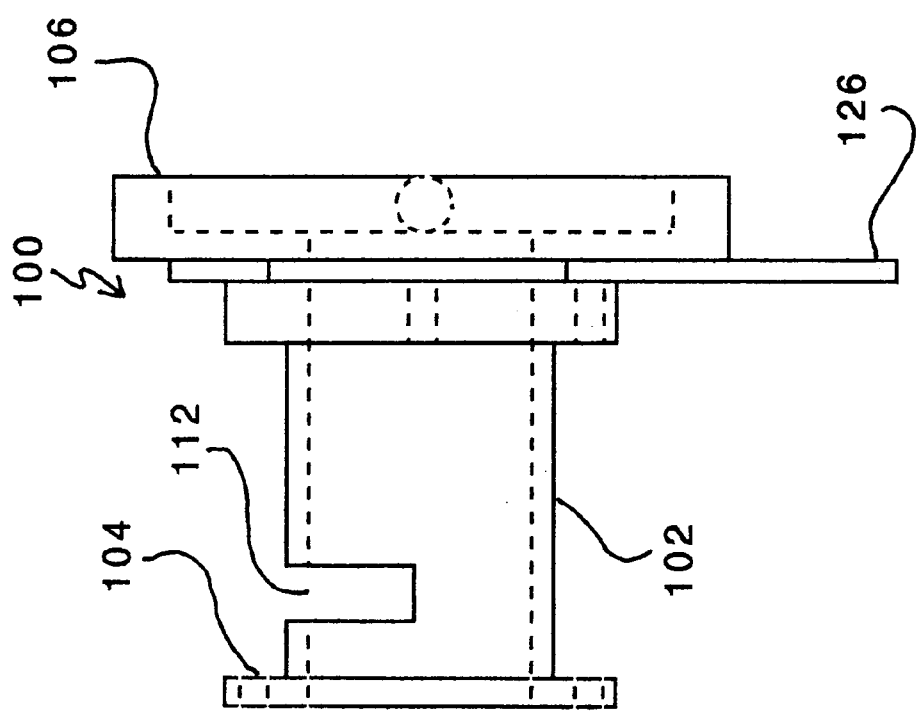

FIG. 12A and 12B show a side view and an end view of a lamphouse assembly 100, which consists of a hollow body 102, a filter slot 112, a mounting flange 104 for attaching the assembly to the side of beam splitter housing 78 (not shown), a sliding shutter 126, and a mating variety lamphouse flange 106 for attaching a lamphouse light source or a second dye laser system.

Figures 13A, 13B:
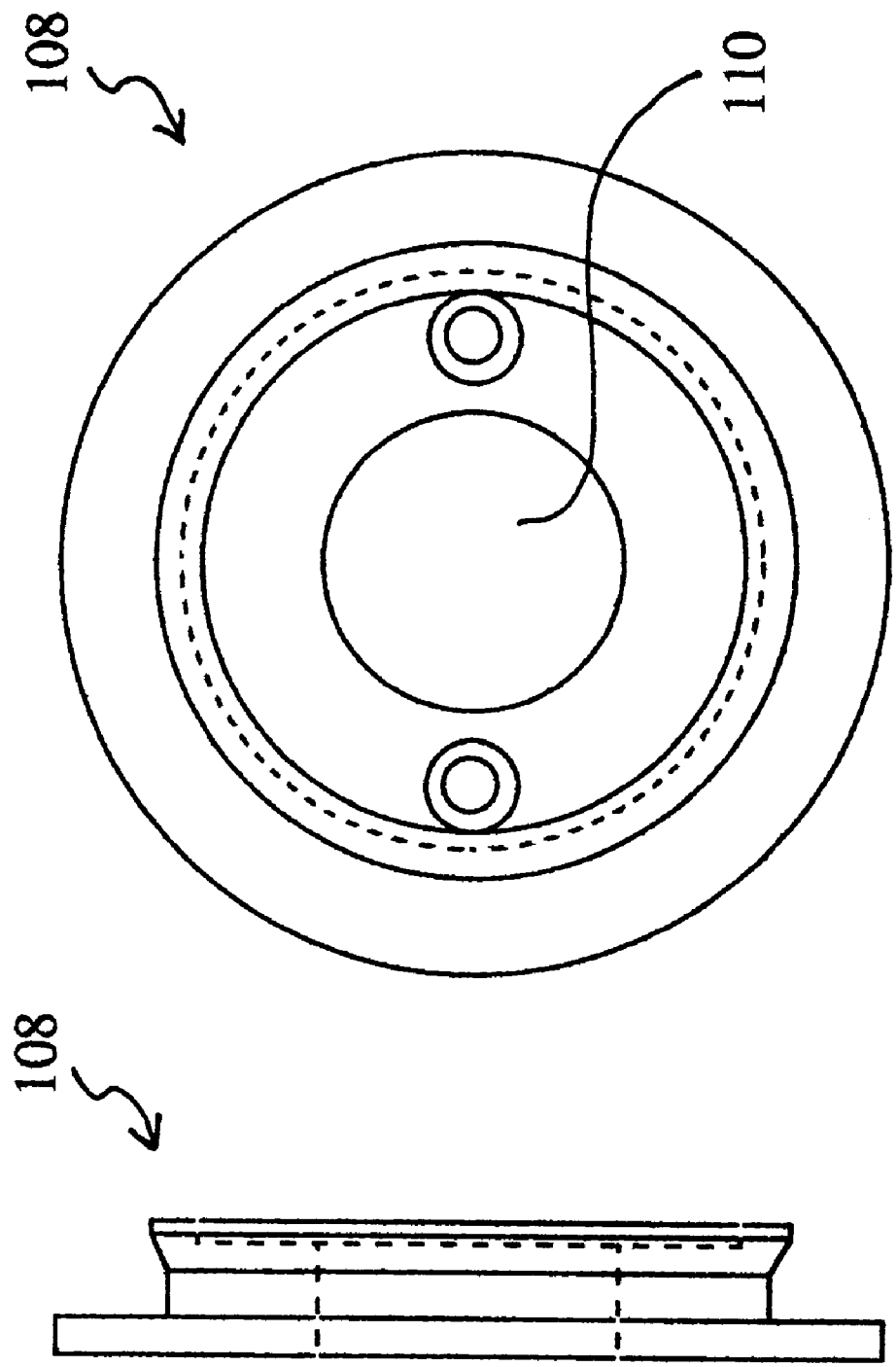
FIGS. 13A and 13B show a front view and a side view, respectively, of the microscope flange shown in FIG. 1.

FIGS. 13A and 13B show a front view and a side view, respectively, of a typical microscope flange 108 which mounts to the front of beam splitter housing 78 and contains a central aperture 110. The microscope flange 108 is the mating part of the epi-illumination flange 133 found at the epi-illumination port of a microscope (FIG. 1). Shown here is the counterpart of the a typical Zeiss™ flange.

Operation and use of the preferred dye laser system is simple and straightforward. Pumping radiation, typically from a pulsed nitrogen laser, is directed to the device from a remote location by a fiber optic with a standard (SMA type) end connector which attaches to a mating connector on the device. With reference to FIGS. 7A, 7B, 7C and 7D this connector, termed a fiber optic ferrule 44, is attached to dye cell holder 38. Lens 10A serves to collect the pump radiation, hereafter called the pump beam, and relay the output of the optical fiber. Lens 10B, typically a plano-cylindrical lens, serves to further focus the pump beam in one axis only, and that axis being the Y-axis of FIG. 2. Thus, a flattened elliptically shaped pump beam is brought to focus within dye cavity 28 as close as possible to the inner surface of pump window 12. With reference to FIG. 2, the pump beam profile at the inner surface of pump window 12 is elongated in the plane of the z-axis, yet very narrow in the plane of the y-axis. With reference to FIG. 6A, the pump beam profile at the inner surface of pump window 12 is elongated along a line perpendicular to laser mirror 14 and output coupler 16.

With reference to FIG. 4B and 4C, the pump beam profile would be elongated in a plane perpendicular to the plane of the drawing.

With reference to FIGS. 3A, 7A and 8, the dye laser beam generated in the dye cell exits the front aperture of the dye cell holder 38 and passes through beam displacer 18A. The beam displacer 18A (or beam displacer 18B) is a plano-element in the shape of a cylinder with its two parallel surfaces nominally placed perpendicular to the path of the dye laser beam, represented by the z-axis of FIG. 3. Beam displacer 18A is held within a spherical ball bearing 56 and can be rotated about the y-axis or the x-axis of FIG. 3. Refraction by the parallel surfaces of the beam displacer causes the dye laser beam to be displaced in space an amount related to the degree of rotation and the thickness of the beam displacer 18A. The emergent beam is parallel to the incident beam. The purpose of beam displacer 18A is to provide a simple mechanism of aligning the dye laser beam relative to telescope lens 20A. Precise alignment can be achieved by the user manipulating a joystick 60 while monitoring the dye laser beam exiting the device. With the dye laser system mounted on a microscope, beam displacer 18A is used to center the laser beam at the plane of the rear aperture 138 of a microscope objective.

Telescope lens 20A can also be positioned about the optical axis (z-axis) by the alignment screws 64 holding the lens translator 62 in place (FIG. 9) inside the optic tube 128 (FIG. 1). For example, loosening an alignment screw on the top of the optic tube and then tightening the opposing screw on the bottom of the optic tube will translate telescope lens 20A downward along the y-axis of FIG. 1. This alignment is performed when both beam displacers are placed at their nominal positions and is intended to be performed at the time of manufacture, although could easily be performed by a prospective user if necessary.

Thus, laser assembly 131 can be attached directly to an epi-illumination port of an optical microscope. Ports 86 and 87, and beamsplitter 24 allow the full use of epi-illumination sources. Assembly 131 includes all the mechanical and optical elements for introducing a dye laser beam into a microscope, and making the dye laser beam co-incident to the axis of illumination of the microscope and making the beam come to focus at the object plane of the microscope.

Telescope lens 20A and 20B provide a mechanism of focussing the dye laser beam such that the point of focus when the system is attached to a microscope will fall in a continuous range above and below the object plane of the microscope.

Beam displacer 18B provides mechanism to translate the dye laser beam in two axis such that the user can direct the beam to selected areas of a specimen being viewed under the microscope.

Dye cell 36 constitutes a resonator cavity that can be easily removed from laser assembly 131 for cleaning, and exchange or replacement of the fluorescent dye. Dye cell 36 is self-aligning when placed back into holder 38. To change output wavelength quickly, multiple dye cells 36 can be at hand containing different fluorescent dyes, obviating the need for changing dye solutions. The user need only change dye cells instead of emptying, cleaning and changing solutions.

Fiber optic cable 157, fiber optic ferrule 44, and lens 10A and 10B allow dye laser cell 36 to be optically pumped by laser 155 from a remote location. Ferrule 44 is mechanical attachment for fiber 157. Lenses 10A and 10B shape and direct the laser beam nitrogen laser 155 into dye cell 36.

An epi-illumination light source, lamphouse 165 (FIG. 3A), can be attached to assembly 131 via ports 86 or 87, to provide additional illumination simultaneously and co-incident with the dye laser illumination. Two epi-illumination sources can be attached to the laser system and the user can select between them by turning the direction knob 136 without the need for realignment. These epi-illumination sources may be additional dye laser systems themselves. Multiple dye laser systems can be mounted to one another to provide multiple sources of dye laser illumination for the microscopist.

The preferred system allows for placement of various excitation and/or barrier filters so that illumination can be tuned to selected wavelengths.

Thus, the preferred system is easily adaptable to most research microscopes. Applications include biological research, semi-conductor failure analysis, circuit isolation, removal of passivation, removal of passivation from integrated circuits, selective ablation for removal, trim and repair of materials at discreet planes or levels, removal of photoresist, free radical release, mask repair/trimming, mask micro-contamination removal, LCD passivation removal, circuit repair, LCD indium tin oxide repair, and micro-machining.

REFERENCE NUMERALS 10A lens
10B lens
11 interior surface of pump window
12 pump window
14 laser mirror
15 interior surface of laser mirror
16 output coupler
17 inner surface
18A beam displacer
18B beam displacer
20A telescope lens
20B telescope lens
24 beam splitter
28 dye cavity
30 alignment groove
32 positioning notch
36 dye cell
37 aluminum body
38 dye cell holder
40 slot
42 dowel pin
44 fiber optic ferrule
46 front aperture
48 thumbscrew
56 ball bearing
58 bearing cups
60 joystick
61 joystick
62 lens translator
64 alignment screws
66 focus translator
68 mechanical threads
70 holes
72 pins
74 focus plate
76 focus tube
78 beam splitter housing
80 plug bore
82 beam entrance aperture
84 beam exit aperture
86 lamphouse port
87 lamphouse port
88 steel balls
90 magnet
91 magnet
92 beam splitter plug
94 mirror face
96 laser aperture
97 laser aperture
98 grooves
100 lamphouse assembly
104 mounting flange
106 lamphouse flange
108 microscope flange
110 central aperture
112 filter slot
113 window ring 114 window ring
115 window ring
116 optical cavity
117 O-ring
118 O-ring
119 O-ring
120 mounting screws
121 mounting screws
122 variable attenuator
123 mounting screws
124 bearing disc
126 sliding shutter
128 optic tube
130 displacement tube
131 dye laser system
133 epi-illumination flange
134 microscope
135 beam splitter direction knob
136 knob bore
137 dichroic element
138 rear aperture
139 rear image plane
140 front element
150 pump window counterbore
151 laser mirror counterbore
152 output coupler counterbore
153 large counterbore
155 pulsed nitrogen laser
157 fiber optic cable
161 specimen plane
163 viewing point
165 lamphouse Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A system for observing a magnified image of an object and for projecting laser radiation onto the object at a location corresponding to the image, the system comprising:
    a microscope including
        a first optical path for projecting light onto the object,
        a second optical path for receiving light reflected from the object; and
    a laser assembly, removably attached to the first optical path, the laser assembly including
        a dye cell defining a cavity for containing a liquid, the dye cell including a first window for receiving radiation and a second window for emitting radiation,
        a wall defining a cavity for receiving the dye cell,
        a connector, attached to the wall, for removably attaching to an optical cable, and
        a screw mechanism for biasing the dye cell against the wall, to align the first window with the optical cable and to align the second window with the first optical path of the microscope.

2. The system of claim 1 wherein the dye cell defines a concave portion and the biasing mechanism defines a convex portion for engaging with the concave portion.

3. The system of claim 1 wherein the biasing mechanism is configured to bias the dye cell in a direction transverse to the wall.

4. The system of claim 1 wherein the first window defines an interior surface extending into the liquid cavity.

5. The system of claim 1 wherein the laser assembly further defines ports for receiving illumination light and an optical element for aligning the illumination light with the first optical path of the microscope.

6. A laser assembly for an optical microscope, the laser assembly comprising:
    a dye cell for generating a laser beam, the dye cell including
        a first mirror,
        a second mirror opposed to the first mirror, the second mirror being partially reflective emitting radiation to the outside of the dye cell, and
        a window for receiving radiation from outside the dye cell, the window having a major surface transverse to the first and second mirrors,
            wherein the first and second mirrors and the window define a cavity for containing a liquid;
    a dye cell holder including means for positioning and securing the dye cell in six-axis spatial alignment relative to the dye cell holder;
    a first beam displacer, in an optical path between the dye cell and the microscope, including an optical element with two parallel surfaces nominally perpendicular to the axis of the optical path, and having a means to tilt the optical element;
    a second beam displacer, in the optical path, including an optical element with two parallel surfaces nominally perpendicular to the axis of the optical path, and having a means to tilt the optical element;
    a telescope, between the first and second beam displacers, including means for bring the laser beam to focus at a location along the optical path.

7. The laser assembly of claim 6 further including
    a beam splitter housing means for attaching and positioning an optical beam splitter, in the optical path, to allow an illumination beam to be reflected co-axially to the laser beam.

8. The laser assembly of claim 6 further including
    a mounting flange assembly for attaching the dye laser system to an epi-illumination port of a microscope.

* * * * *